(12) United States Patent
Kumagai

(10) Patent No.: US 12,257,774 B2
(45) Date of Patent: Mar. 25, 2025

(54) THREE-DIMENSIONAL OBJECT PRINTING APPARATUS AND THREE-DIMENSIONAL OBJECT PRINTING METHOD

(71) Applicant: SEIKO EPSON CORPORATION, Tokyo (JP)

(72) Inventor: Masaru Kumagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/304,846

(22) Filed: Jun. 27, 2021

(65) Prior Publication Data

US 2021/0402686 A1 Dec. 30, 2021

(30) Foreign Application Priority Data

Jun. 29, 2020 (JP) ................................. 2020-111314

(51) Int. Cl.
*B33Y 10/00* (2015.01)
*B05B 1/20* (2006.01)
(Continued)

(52) U.S. Cl.
CPC ............ *B29C 64/209* (2017.08); *B05B 1/205* (2013.01); *B05B 1/3006* (2013.01); *B05B 9/03* (2013.01); *B05B 12/124* (2013.01); *B05B 13/0431* (2013.01); *B05B 17/0646* (2013.01); *B05B 17/0676* (2013.01); *B29C 64/112* (2017.08); *B29C 64/393* (2017.08); *B33Y 10/00* (2014.12); *B33Y 30/00* (2014.12); *B33Y 50/02* (2014.12); *B41J 3/4073* (2013.01)

(58) Field of Classification Search
None
See application file for complete search history.

(56) References Cited

U.S. PATENT DOCUMENTS 10,000,065 B1 6/2018 Baker et al.
2001/0017085 A1* 8/2001 Kubo ...................... B41J 2/01
101/35
(Continued)

FOREIGN PATENT DOCUMENTS

| CN | 104228339 | 12/2014 |
|---|---|---|
| CN | 111032362 | 4/2020 |

(Continued)

*Primary Examiner* — Erica S Lin
(74) *Attorney, Agent, or Firm* — WORKMAN NYDEGGER

(57) ABSTRACT

A three-dimensional object printing apparatus includes a liquid discharge head having a nozzle surface, a moving mechanism that changes a position and a pose of the liquid discharge head relative to a three-dimensional workpiece, and a controller. The workpiece has a first surface and a second surface that forms a corner bent or curved in a concave shape between the first surface and the second surface. When an axis along a scanning direction of the liquid discharge head with respect to the workpiece in a first printing operation of performing printing on the first surface is a first scanning axis and a normal vector of the nozzle surface in the first printing operation is a first discharge vector, the controller controls the driving of the moving mechanism such that the first discharge vector has a component in a direction toward the second surface along the first scanning axis.

15 Claims, 10 Drawing Sheets

(51) Int. Cl.
  *B05B 1/30* (2006.01)
  *B05B 9/03* (2006.01)
  *B05B 12/12* (2006.01)
  *B05B 13/04* (2006.01)
  *B05B 17/00* (2006.01)
  *B05B 17/06* (2006.01)
  *B29C 64/112* (2017.01)
  *B29C 64/209* (2017.01)
  *B29C 64/393* (2017.01)
  *B33Y 30/00* (2015.01)
  *B33Y 50/02* (2015.01)
  *B41J 3/407* (2006.01)

(56) References Cited

U.S. PATENT DOCUMENTS

| | | | |
|---|---|---|---|
| 2008/0094428 A1 | 4/2008 | Otis et al. | |
| 2009/0169719 A1* | 7/2009 | Orr | B41J 3/4073 |
| | | | 427/8 |
| 2017/0253024 A1* | 9/2017 | LaCaze | B41J 3/4073 |
| 2019/0344343 A1* | 11/2019 | Camilleri | B22F 12/53 |
| 2020/0215834 A1 | 7/2020 | Bauer | |

FOREIGN PATENT DOCUMENTS

| | | |
|---|---|---|
| DE | 102014006991 | 12/2014 |
| DE | 102014006991 A | 12/2014 |
| JP | 2016-117189 A | 6/2016 |
| JP | 2016-175358 | 10/2016 |
| JP | 2016-175358 A | 10/2016 |
| JP | 2017-071173 A | 4/2017 |
| WO | 2015-145950 | 10/2015 |

* cited by examiner

THREE-DIMENSIONAL OBJECT PRINTING APPARATUS AND THREE-DIMENSIONAL OBJECT PRINTING METHOD

The present application is based on, and claims priority from JP Application Serial Number 2020-111314, filed Jun. 29, 2020, the disclosure of which is hereby incorporated by reference herein in its entirety.

BACKGROUND

1. Technical Field

The present disclosure relates to a three-dimensional object printing apparatus and a three-dimensional object printing method.

2. Related Art

A three-dimensional object printing apparatus that performs printing on a surface of a three-dimensional object by an ink jet method has been known. For example, an apparatus described in JP-A-2016-175358 includes an ink jet head that discharges an ink and a robot arm that can change a discharge direction of the ink by the ink jet head. In JP-A-2016-175358, the robot arm moves the ink jet head along the surface such that a state in which the discharge direction is orthogonal to the surface of the three-dimensional object is maintained.

In the apparatus described in JP-A-2016-175358, since the discharge direction of the ink due to the ink jet head is constantly orthogonal to a discharge target portion on the surface of the three-dimensional object, even though printing is desired to be performed on a concave corner formed at the surface of the three-dimensional object, the ink jet head interferes with the surface of the three-dimensional object. Thus, the apparatus described in JP-A-2016-175358 has a problem that printing cannot be performed at or near the corner.

SUMMARY

According to an aspect of the present disclosure, a three-dimensional object printing apparatus includes a liquid discharge head having a nozzle surface on which a plurality of nozzles which discharge a liquid are provided, and a moving mechanism that changes a position and a pose of the liquid discharge head relative to a three-dimensional workpiece. The workpiece has a first surface and a second surface that forms a corner bent or curved in a concave shape between the first surface and the second surface, and when an axis along a scanning direction of the liquid discharge head with respect to the workpiece in a first printing operation of performing printing on the first surface is a first scanning axis and a normal vector of the nozzle surface in the first printing operation is a first discharge vector, the driving of the moving mechanism is controlled such that the first discharge vector has a component in a direction toward the second surface along the first scanning axis.

According to another aspect of the present disclosure, a three-dimensional object printing apparatus includes a liquid discharge head having a nozzle surface on which a plurality of nozzles which discharge a liquid are provided, a moving mechanism that changes a position and a pose of the liquid discharge head relative to a three-dimensional workpiece, and a controller that controls driving of each of the liquid discharge head and the moving mechanism. The nozzle surface has a nozzle array including a plurality of nozzles arrayed, a first end in a direction intersecting an array direction of the plurality of nozzles, and a second end on a side opposite to the first end, the workpiece has a first surface and a second surface that forms a corner bent or curved in a concave shape between the first surface and the second surface, and the controller executes a first printing operation of performing printing on the first surface in a state in which the nozzle surface is tilted with respect to the first surface such that a distance between the first end and the first surface is larger than a distance between the second end and the first surface and a distance between the first end and the second surface is smaller than a distance between the second end and the second surface.

According to still another aspect of the present disclosure, a three-dimensional object printing method for performing printing on a three-dimensional workpiece by using a liquid discharge head having a nozzle surface on which a plurality of nozzles which discharge a liquid are provided. The workpiece has a first surface and a second surface that forms a corner bent or curved in a concave shape between the first surface and the second surface, and when an axis along a scanning direction of the liquid discharge head with respect to the workpiece in a first printing operation of performing printing on the first surface is a first scanning axis and a normal vector of the nozzle surface in the first printing operation is a first discharge vector, the first discharge vector has a component in a direction toward the second surface along the first scanning axis.

DESCRIPTION OF EXEMPLARY EMBODIMENTS

Figure 1:
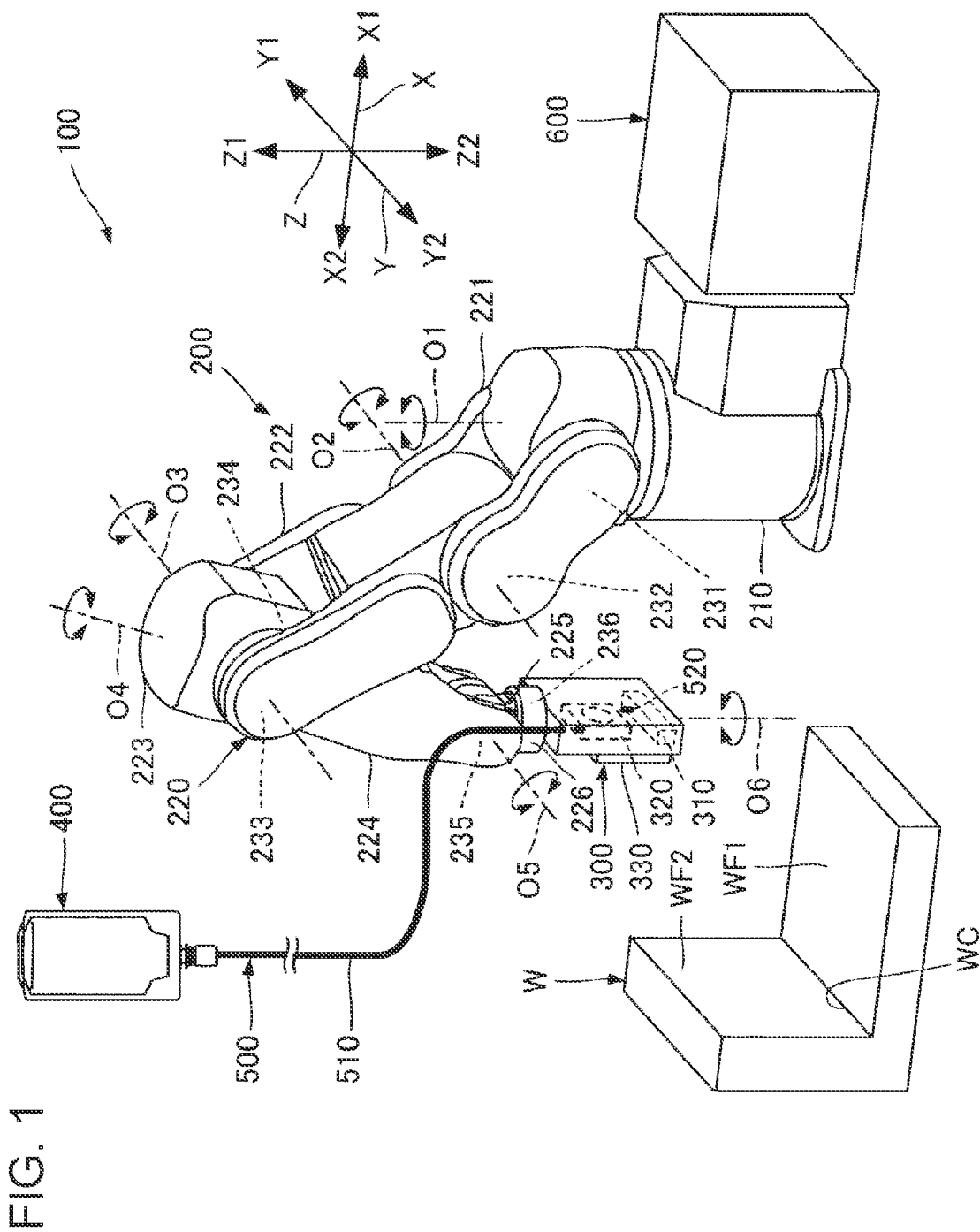
FIG. 1 is a perspective view illustrating an outline of a three-dimensional object printing apparatus according to a first embodiment.

Hereinafter, preferred embodiments according to the present disclosure will be described with reference to the accompanying drawings. In the drawings, the dimensions or scales of each portion are appropriately different from the actual dimensions or scales, and some portions are schematically illustrated for easy understanding. The scope of the present disclosure is not limited to these forms unless otherwise particularly stated to limit the present disclosure in the following description.

The following description will be performed by using an X-axis, a Y-axis, and a Z-axis that intersect each other as appropriate. One direction along the X-axis is referred to as an X1 direction, and a direction opposite to the X1 direction is referred to as an X2 direction. Similarly, directions opposite to each other along the Y-axis are referred to as a Y1 direction and a Y2 direction. Directions opposite to each other along the Z-axis are referred to as a Z1 direction and a Z2 direction.

Here, the X-axis, the Y-axis, and the Z-axis are coordinate axes of a base coordinate system set in a space in which a workpiece W and a base 210 to be described later are installed. Typically, the Z-axis is a vertical axis, and the Z2 direction corresponds to a downward direction in a vertical direction. The Z-axis may not be a vertical axis. Although the X-axis, the Y-axis, and the Z-axis are typically orthogonal to each other, the present disclosure is not limited thereto, and the axes may not be orthogonal to each other. For example, the X-axis, Y-axis, and Z-axis may intersect each other at an angle within a range of 80° or more and 100° or less.

1. First Embodiment 1-1. Outline of Three-Dimensional Object Printing Apparatus

FIG. 1 is a perspective view illustrating an outline of a three-dimensional object printing apparatus 100 according to a first embodiment. The three-dimensional object printing apparatus 100 is an apparatus that prints on a surface of the workpiece W which is an example of a three-dimensional object by an ink jet method. The workpiece W has a first surface WF1 and a second surface WF2 that form a corner WC bent or curved in a concave shape.

In the example illustrated in FIG. 1, the first surface WF1 and the second surface WF2 are orthogonal to each other, and the corner WC is formed by the intersection thereof. Here, the first surface WF1 is a plane facing the Z1 direction. The second surface WF2 is a plane facing the X1 direction. A shape of the workpiece W is not limited to the example illustrated in FIG. 1, and may be any shape having two surfaces forming the corner bent or curved in the concave shape as the first surface and the second surface. Although details will be described later in Modification Examples, for example, the shape of the workpiece W may be a shape in which the angle formed by the first surface WF1 and the second surface WF2 is smaller than 90°, and may be a shape in which the angle formed by the first surface WF1 and the second surface WF2 is larger than 90°. An installation pose of the workpiece W is not limited to the example illustrated in FIG. 1, and is any pose.

In the example illustrated in FIG. 1, the three-dimensional object printing apparatus 100 is an ink jet printer using a vertical articulated robot. Specifically, as illustrated in FIG. 1, the three-dimensional object printing apparatus 100 includes a robot 200, a liquid discharge head unit 300, a liquid reservoir 400, a supply flow path 500, and a control device 600. Hereinafter, first, each portion of the three-dimensional object printing apparatus 100 will be briefly described in sequence.

The robot 200 is an example of a moving mechanism that changes a position and a pose of the liquid discharge head unit 300 with respect to the workpiece W. In the example illustrated in FIG. 1, the robot 200 is a so-called 6-axis vertical articulated robot. Specifically, the robot 200 has a base 210 and an arm 220.

The base 210 is a base that supports the arm 220. In the example illustrated in FIG. 1, the base 210 is fixed to an installation surface such as a floor surface facing the Z1 direction by screwing or the like. The installation surface to which the base 210 is fixed may be a surface facing any direction, but is not limited to the example illustrated in FIG. 1, and may be, for example, a surface of a wall, a ceiling, a movable carriage, or the like.

The arm 220 is a 6-axis robot arm having a base end attached to the base 210 and a tip of which a position and a pose is three-dimensionally changed with respect to the base end. Specifically, the arm 220 has arms 221, 222, 223, 224, 225, and 226, and these arms are coupled in this order.

The arm 221 is rotatably coupled to the base 210 around a first rotation axis O1 via a joint portion 231. The arm 222 is rotatably coupled to the arm 221 around a second rotation axis O2 via a joint portion 232. The arm 223 is rotatably coupled to the arm 222 around a third rotation axis O3 via a joint portion 233. The arm 224 is rotatably coupled to the arm 223 around a fourth rotation axis O4 via a joint portion 234. The arm 225 is rotatably coupled to the arm 224 around a fifth rotation axis O5 via a joint portion 235. The arm 226 is rotatably coupled to the arm 225 around a sixth rotation axis O6 via a joint portion 236.

In the example illustrated in FIG. 1, each of the joint portions 231 to 236 is a mechanism for rotatably coupling one of two adjacent arms to the other arm. Although not illustrated, a drive mechanism for rotating one of two adjacent arms with respect to the other arm is provided in each of the joint portions 231 to 236. The drive mechanism includes, for example, a motor that generates a driving force for the rotation, a speed reducer that decelerates and outputs the driving force, and an encoder such as a rotary encoder that detects an angle of the rotation or the like. The drive mechanism corresponds to an arm drive mechanism 230 illustrated in FIG. 2 to be described later.

The first rotation axis O1 is an axis perpendicular to an installation surface (not illustrated) to which the base 210 is fixed. The second rotation axis O2 is an axis perpendicular to the first rotation axis O1. The third rotation axis O3 is an axis parallel to the second rotation axis O2. The fourth rotation axis O4 is an axis perpendicular to the third rotation axis O3. The fifth rotation axis O5 is an axis perpendicular to the fourth rotation axis O4. The sixth rotation axis O6 is an axis perpendicular to the fifth rotation axis O5.

As for these rotation axes, a case where one axis is "perpendicular" to the other axis includes a case where the angle formed by the two rotation axes is strictly 90° and a case where the angle formed by the two rotation axes deviates within a range of about 90° to ±5°. Similarly, a case where one axis is "parallel" to the other axis includes a case where the two rotation axes are strictly parallel and a case where one of the two rotation axes tilts with respect to the other axis within a range of about ±5°.

The liquid discharge head unit 300 is attached, as an end effector, to a tip of the arm 221, that is, the arm 226.

The liquid discharge head unit 300 is a mechanism having a liquid discharge head 310 that discharges ink which is an example of a liquid toward the workpiece W. In the present embodiment, the liquid discharge head unit 300 is a pressure adjustment valve 320 that adjusts a pressure of the ink to be supplied to the liquid discharge head 310, and a displacement sensor 330 that measures a distance from the workpiece W in addition to the liquid discharge head 310. Since both the pressure adjustment valve and the displacement sensor are fixed to the arm 226, a relationship between the positions and the poses is fixed.

The liquid discharge head 310 and the pressure adjustment valve 320 will be described in detail later. The displacement sensor 330 is, for example, an optical displacement sensor that measures the amount of displacement when moving from one position to another position. The displacement sensor 330 may be provided as needed or may be omitted. Although the number of each of the liquid discharge head 310 and the pressure adjustment valve 320 included in the liquid discharge head unit 300 is one in the example illustrated in FIG. 1, the present disclosure is not limited to the example illustrated in FIG. 1, and the number may be two or more. Installation positions of the pressure adjustment valve 320 and the displacement sensor 330 are not limited to the arm 226, and the pressure adjustment valve and the displacement sensor may be, for example, another arm or the like.

The liquid reservoir 400 is a container that reserves the ink. The liquid reservoir 400 is, for example, a bag-shaped ink pack made of a flexible film. The ink reserved in the liquid reservoir 400 is, for example, ink containing a coloring material such as a dye or a pigment. A type of the ink reserved in the liquid reservoir 400 is not limited to the ink containing the coloring material, and may be, for example, ink containing a conductive material such as metal powder. The ink may have curability such as ultraviolet curability. When the ink has the curability such as ultraviolet curability, for example, an ultraviolet irradiation mechanism is mounted on the liquid discharge head unit 300.

In the example illustrated in FIG. 1, the liquid reservoir 400 is fixed to a wall, a ceiling, a pillar, or the like such that the liquid reservoir is constantly positioned in the Z1 direction from the liquid discharge head 310. That is, the liquid reservoir 400 is positioned above a moving region of the liquid discharge head 310 in the vertical direction. Thus, the ink can be supplied from the liquid reservoir 400 to the liquid discharge head 310 with a predetermined pressing force without using a mechanism such as a pump.

The liquid reservoir 400 can be installed at a position such that the ink is supplied from the liquid reservoir 400 to the liquid discharge head 310 with a predetermined pressure, and the liquid reservoir may be positioned below the liquid discharge head 310 in the vertical direction. In this case, for example, the ink may be supplied from the liquid reservoir 400 to the liquid discharge head 310 at a predetermined pressure by using a pump.

The supply flow path 500 is a flow path for supplying the ink from the liquid reservoir 400 to the liquid discharge head 310. The pressure adjustment valve 320 is provided in the middle of the supply flow path 500. Thus, even though a positional relationship between the liquid discharge head 310 and the liquid reservoir 400 changes, a fluctuation in a pressure of the ink in the liquid discharge head 310 can be reduced.

The supply flow path 500 is divided into an upstream flow path 510 and a downstream flow path 520 by the pressure adjustment valve 320. That is, the supply flow path 500 has the upstream flow path 510 that communicatively couples the liquid reservoir 400 and the pressure adjustment valve 320, and the downstream flow path 520 that communicatively couples the pressure adjustment valve 320 and the liquid discharge head 310.

Each of the upstream flow path 510 and the downstream flow path 520 is formed by, for example, an internal space of a pipe body. Here, the pipe body used for the upstream flow path 510 is made of, for example, an elastic material such as a rubber material or an elastomer material, and has flexibility. As stated above, the upstream flow path 510 is formed by using the flexible pipe body, and thus, a change in the relative positional relationship between the liquid reservoir 400 and the pressure adjustment valve 320 is allowed. Accordingly, even though the position or the pose of the liquid discharge head 310 changes while the position and the pose of the liquid reservoir 400 are fixed, the ink can be supplied from the liquid reservoir 400 to the pressure adjustment valve 320. On the other hand, the pipe body used for the downstream flow path 520 may not have flexibility. Accordingly, the pipe body used for the downstream flow path 520 may be made of an elastic material such as a rubber material or an elastomer material, or may be made of a hard material such as a resin material.

A part of the upstream flow path 510 may be formed by a member having no flexibility. The downstream flow path 520 is not limited to the configuration using the pipe body. For example, a part or the entirety of the downstream flow path 520 may have a distribution flow path for distributing the ink from the pressure adjustment valve 320 to a plurality of locations, or may be integrally formed with the liquid discharge head 310 or the pressure adjustment valve 320.

The control device 600 is a device that controls the driving of each portion of the three-dimensional object printing apparatus 100. Here, the control device 600 is an example of a controller, and controls the driving of the liquid discharge head 310 and the robot 200. The control device 600 will be described in detail together with the following description of an electrical configuration of the three-dimensional object printing apparatus 100.

1-2. Electrical Configuration of Three-dimensional Object Printing Apparatus

Figure 2:
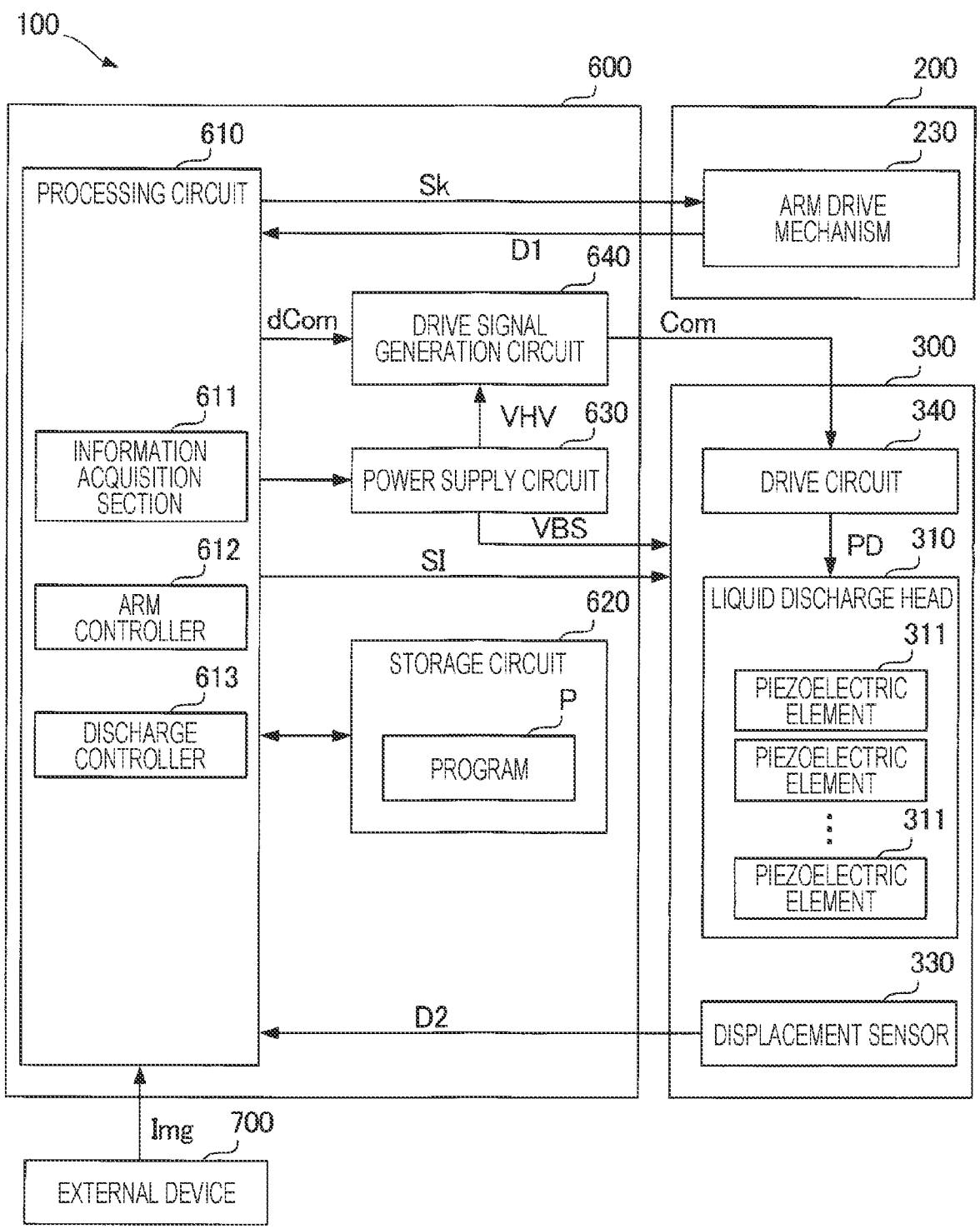
FIG. 2 is a block diagram illustrating an electrical configuration of the three-dimensional object printing apparatus according to the first embodiment.

FIG. 2 is a block diagram illustrating an electrical configuration of the three-dimensional object printing apparatus 100 according to the first embodiment. FIG. 2 illustrates electrical components among the components of the three-dimensional object printing apparatus 100. As illustrated in FIG. 2, the control device 600 includes a processing circuit 610, a storage circuit 620, a power supply circuit 630, and a drive signal generation circuit 640.

The processing circuit 610 has a function of controlling an operation of each portion of the three-dimensional object printing apparatus 100 and a function of processing various kinds of data. The processing circuit 610 includes, for example, one or more processors such as a central processing unit (CPU). The processing circuit 610 may include a programmable logic device such as a field-programmable gate array (FPGA) instead of the CPU or in addition to the CPU. A hardware configuration included in the control device 600 may be appropriately divided. For example, an arm controller 612 and the drive signal generation circuit 640 of the control device 600 may be provided separately in different hardware configurations. A part or all of the functions of the control device 600 may be achieved by an external device coupled to the three-dimensional object printing apparatus 100 via a network such as a local area network (LAN) or the Internet.

The storage circuit 620 stores various programs such as a program P executed by the processing circuit 610 and various kinds of data such as print data Img processed by the processing circuit 610. The storage circuit 620 includes, for example, one or both semiconductor memories of a volatile memory such as a random access memory (RAM) and a non-volatile memory such as a read only memory (ROM), an electrically erasable programmable read-only memory (EEPROM) or a programmable ROM (PROM). The print data Img is supplied from an external device 700 such as a personal computer. The storage circuit 620 may be formed as a part of the processing circuit 610.

The power supply circuit 630 receives a power from a commercial power supply (not illustrated) and generates various predetermined potentials. The generated various potentials are appropriately supplied to each portion of the three-dimensional object printing apparatus 100. For example, the power supply circuit 630 generates a power supply potential VHV and an offset potential VBS. The offset potential VBS is supplied to the liquid discharge head unit 300. The power supply potential VHV is supplied to the drive signal generation circuit 640.

The drive signal generation circuit 640 is a circuit that generates a drive signal Com for driving each piezoelectric element 311 included in the liquid discharge head 310. Specifically, the drive signal generation circuit 640 has, for example, a DA conversion circuit and an amplifier circuit. In the drive signal generation circuit 640, the DA conversion circuit converts a waveform designation signal dCom to be described later from the processing circuit 610 from a digital signal to an analog signal, and the amplifier circuit amplifies the analog signal by using the power supply potential VHV from the power supply circuit 630 and generates the drive signal Com. Here, among waveforms included in the drive signal Com, a signal of the waveform actually supplied to the piezoelectric element 311 via the drive circuit 340 for driving the piezoelectric element 311 is a drive pulse PD. The drive circuit 340 switches whether to supply, as the drive pulse PD, at least a part of the waveforms included in the drive signal Com based on a control signal SI to be described later.

In the above control device 600, the processing circuit 610 controls an operation of each portion of the three-dimensional object printing apparatus 100 by executing the program P stored in the storage circuit 620. Specifically, the processing circuit 610 functions as an information acquisition section 611, an arm controller 612, and a discharge controller 613 by executing the program P.

The information acquisition section 611 acquires various kinds of information necessary for driving the robot 200 and the liquid discharge head unit 300. Specifically, the information acquisition section 611 acquires the print data Img from the external device 700, information D1 from the encoder included in the arm drive mechanism 230, and information D2 from the displacement sensor 330. The information acquisition section 611 appropriately reads and acquires information stored in the storage circuit 620, and appropriately stores the acquired various kinds of information in the storage circuit 620.

The arm controller 612 controls the driving of the robot 200 based on the information from the information acquisition section 611. Specifically, the arm controller 612 generates a control signal Sk based on three-dimensional shape data of the workpiece W and the information D1 from the arm drive mechanism 230. The control signal Sk controls the driving of the motor included in the arm drive mechanism 230 such that the liquid discharge head 310 is in a desired position and a desired pose. The three-dimensional shape data is included in, for example, the print data Img, or is obtained by measurement using a displacement sensor 330 or the like.

A correspondence between the information D1 and the position and the pose of the liquid discharge head is acquired in advance by calibration or the like, and is stored in the storage circuit 620. The arm controller 612 acquires information on the actual position and pose of the liquid discharge head 310 based on the information D1 from the actual arm drive mechanism 230 and the correspondence. Control is performed by using information on the position and the pose. The arm controller 612 may appropriately adjust the control signal Sk such that a distance between the liquid discharge head 310 and the surface of the workpiece W is maintained within a predetermined range by using the information D2 from the displacement sensor 330.

In particular, the arm controller 612 controls the pose of the liquid discharge head 310 such that the first surface WF1 or the second surface WF2 is printed over a range including the corner WC of the workpiece W.

The discharge controller 613 controls the driving of the liquid discharge head unit 300 based on the information from the information acquisition section 611. Specifically, the discharge controller 613 generates the control signal SI and the waveform designation signal dCom based on the print data Img. The control signal SI is a digital signal for designating an operating state of the piezoelectric element 311 to be described later which is included in the liquid discharge head 310. Here, the control signal SI may include other signals such as a timing signal for defining a drive timing of the piezoelectric element 311. The timing signal is generated, for example, based on the information D1 from the encoder included in the arm drive mechanism 230. The waveform designation signal dCom is a digital signal for defining a waveform of the drive signal Com.

1-3. Liquid Discharge Head and Pressure Adjustment Valve

Figure 3:
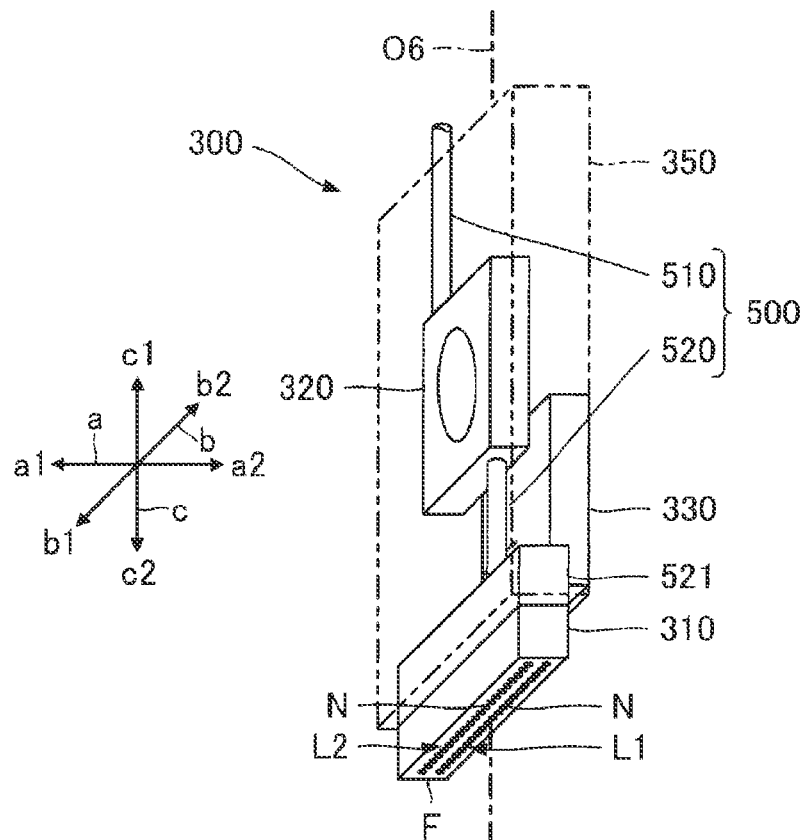
FIG. 3 is a perspective view illustrating a schematic configuration of a liquid discharge head unit according to the first embodiment.

FIG. 3 is a perspective view illustrating a schematic configuration of the liquid discharge head unit 300 according to the first embodiment.

The following description will be performed by using an a-axis, a b-axis, and a c-axis that intersect each other as appropriate. One direction along the a-axis is referred to as an a1 direction, and a direction opposite to the a1 direction is referred to as an a2 direction. Similarly, directions opposite to each other along the b-axis are referred to as a b1 direction and a b2 direction. Directions opposite to each other along the c-axis are referred to as a c1 direction and a c2 direction.

Here, the a-axis, the b-axis, and the c-axis are coordinate axes of a tool coordinate system set in the liquid discharge head unit 300, and a relationship between a position and a pose relative to the above-mentioned X-axis, Y-axis, and Z-axis changes by the operation of the above-mentioned robot 200. In the example illustrated in FIG. 3, the c-axis is an axis parallel to the above-mentioned sixth rotation axis O6. Although the a-axis, the b-axis, and the c-axis are typically orthogonal to each other, the present disclosure is not limited thereto, and the axes may intersect at an angle within, for example, a range of 80° or more and 100° or less.

As described above, the liquid discharge head unit 300 has the liquid discharge head 310, the pressure adjustment valve 320, and the displacement sensor 330. These portions are supported by a support 350 illustrated by a dashed double-dotted line in FIG. 3.

The support 350 is made of, for example, a metal material or the like, and is a substantially rigid body. In FIG. 3, the support 350 has a flat box shape, but a shape of the support 350 is not particularly limited and is any shape.

The above support 350 is attached to the tip of the arm 220, that is, the arm 226. Thus, each of the liquid discharge head 310, the pressure adjustment valve 320, and the displacement sensor 330 is fixed to the arm 226.

In the example illustrated in FIG. 3, the pressure adjustment valve 320 is positioned in the c1 direction with respect to the liquid discharge head 310. The displacement sensor 330 is positioned in the a2 direction with respect to the liquid discharge head 310.

In the example illustrated in FIG. 3, a part of the downstream flow path 520 of the supply flow path 500 is formed by the flow path member 521. The flow path member 521 has a flow path for distributing the ink from the pressure adjustment valve 320 to a plurality of locations of the liquid discharge head 310. The flow path member 521 is, for example, a stacked body of a plurality of substrates made of a resin material, and a groove or a hole for a flow path of the ink is appropriately provided in each substrate.

The liquid discharge head 310 has a nozzle surface F and a plurality of nozzles N opened to the nozzle surface F. In the example illustrated in FIG. 3, a normal direction of the nozzle surface F is the c2 direction, and the plurality of nozzles N are divided into a first nozzle array L1 and a second nozzle array L2 arranged at intervals in a direction along the a-axis. Each of the first nozzle array L1 and the second nozzle array L2 is a set of the plurality of nozzles N linearly arrayed in a direction along the b-axis. Here, in the liquid discharge head 310, elements related to each nozzle N of the first nozzle array L1 and elements related to each nozzle N of the second nozzle array L2 are substantially symmetrical with each other in a direction along the a-axis.

However, positions of the plurality of nozzles N in the first nozzle array L1 and the plurality of nozzles N in the second nozzle array L2 in the direction along the b-axis may or may not coincide with each other. The elements related to each nozzle N of one of the first nozzle array L1 and the second nozzle array L2 may be omitted. Hereinafter, a configuration in which the positions of the plurality of nozzles N in the first nozzle array L1 and the plurality of nozzles N in the second nozzle array L2 in the direction along the b-axis coincide with each other is exemplified.

Figure 4:
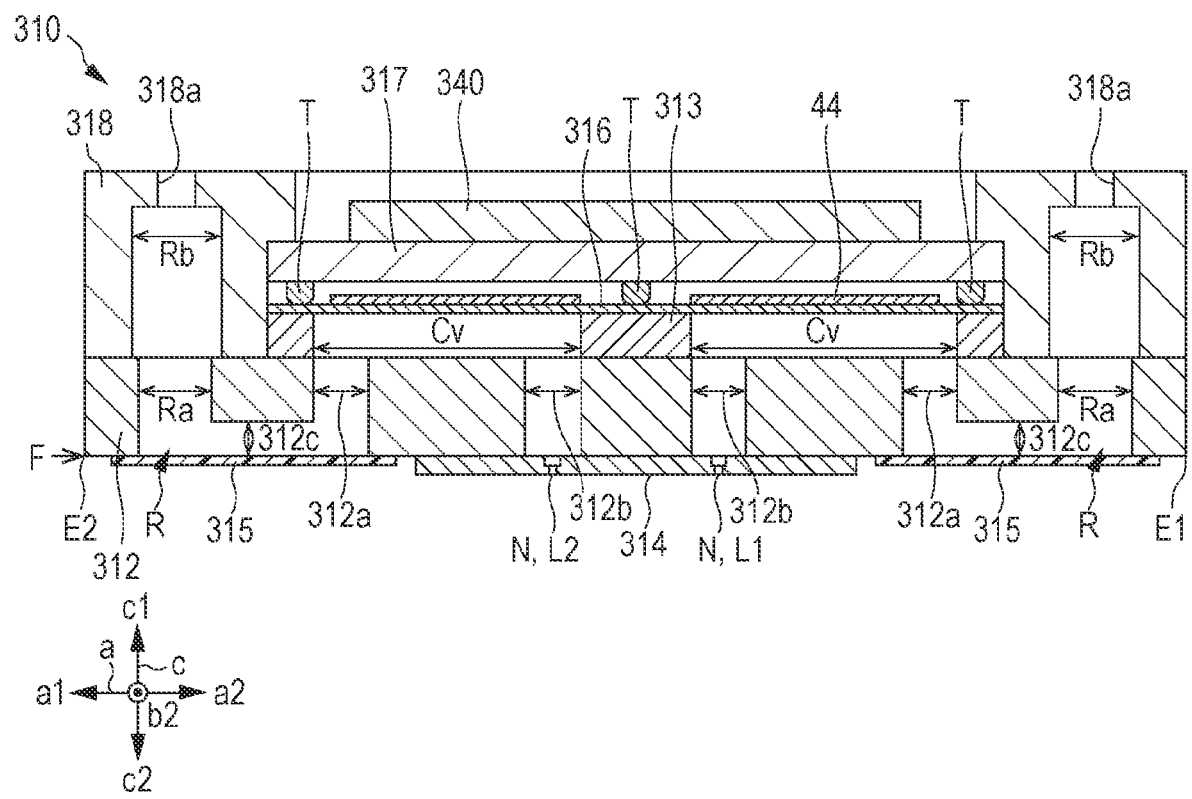
FIG. 4 is a sectional view illustrating a configuration example of the liquid discharge head according to the first embodiment.

FIG. 4 is a sectional view illustrating a configuration example of the liquid discharge head 310 according to the first embodiment. As illustrated in FIG. 4, the liquid discharge head 310 includes a flow path substrate 312, a pressure chamber substrate 313, a nozzle plate 314, a vibration absorber 315, a vibration plate 316, a plurality of piezoelectric elements 311, a wiring substrate 317, and a housing 318.

The flow path substrate 312 and the pressure chamber substrate 313 form a flow path for supplying the ink to the plurality of nozzles N. The flow path substrate 312 and the pressure chamber substrate 313 are stacked in this order in the c1 direction. Each of the flow path substrate 312 and the pressure chamber substrate 313 is a plate-shaped member elongated in the direction along the b-axis. The flow path substrate 312 and the pressure chamber substrate 313 are joined to each other by, for example, an adhesive.

The vibration plate 316, the wiring substrate 317, the housing 318, and the drive circuit 340 are installed in a region positioned in the c1 direction with respect to the pressure chamber substrate 313. On the other hand, the nozzle plate 314 and the vibration absorber 315 are installed in a region positioned in the c2 direction with respect to the flow path substrate 312. These elements are generally plate-shaped members elongated in the direction along the b-axis like the flow path substrate 312 and the pressure chamber substrate 313, and are joined to each other by, for example, an adhesive.

The nozzle plate 314 is a plate-shaped member in which the plurality of nozzles N are formed. Each of the plurality of nozzles N is a circular through-hole through which the ink passes. For example, the nozzle plate 314 is manufactured by processing a silicon single crystal substrate by a semiconductor manufacturing technology using a processing technology such as dry etching or wet etching. However, other known methods and materials may be appropriately used for manufacturing the nozzle plate 314.

Here, the above-described nozzle surface F is a surface that expands from an opening of one end of the nozzle N in the c2 direction along a direction perpendicular to the c-axis among surfaces constituting an outer shape of the liquid discharge head 310. In the example illustrated in FIG. 4, a surface of the liquid discharge head 310 facing the c2 direction is the nozzle surface F, and the nozzle surface F includes a surface of the nozzle plate 314 facing the c2 direction. An end of the nozzle surface F in the a2 direction, that is, a portion of the nozzle surface F positioned so as to be closest to the a2 direction is a first end E1, and an end of the nozzle surface F in the a1 direction, that is, a portion of the nozzle surface F positioned so as to be closest to the a1 direction is a second end E2. In the present embodiment, each of the first end E1 and the second end E2 is a side along the b-axis. The above-mentioned first nozzle array L1 and second nozzle array L2 are provided between the first end E1 and the second end E2 on the nozzle surface F.

When there is a structure that covers a part of the surface of the nozzle plate 314 facing the c2 direction, a surface of the structure facing the c2 direction may be regarded as a part of the nozzle surface F. An example of such a structure is a cover head. The cover head is a structure that covers at least a part of the surface of the nozzle plate 314, the vibration absorber 315, the flow path substrate 312, the housing 318, or the like facing the c2 direction, and is fixed to the nozzle plate 314, the vibration absorber 315, the flow path substrate 312, the housing 318, and the like with an adhesive. The cover head is formed by bending a side surface portion of a plate-shaped member made of a metal material such as stainless steel, for example. In this case, an end of the cover head in the a1 direction may be regarded as the first end E1, or an end of the cover head in the a2 direction may be regarded as the second end E2. When there is a structure such as the support 350 to be described later on the extension of the nozzle surface F, an end of the structure in the a1 direction may be regarded as the first end E1, and an end of the structure in the a2 direction may be regarded as the second end E2. Although an outer shape of the nozzle surface F is typically rectangular, the present disclosure is not limited thereto, and the outer shape is any shape.

A space Ra, a plurality of supply flow paths 312a, a plurality of communication flow paths 312b, and a supply liquid chamber 312c are provided in the flow path substrate 312 for each of the first nozzle array L1 and the second nozzle array L2. The space Ra is a long opening extending in the direction along the b-axis in plan view in a direction along the c-axis. Each of the supply flow paths 312a and the communication flow paths 312b is a through-hole formed for each nozzle N. The supply liquid chamber 312c is a long space extending in the direction along the b-axis over the plurality of nozzles N, and allows the space Ra and the plurality of supply flow paths 312a to be communicatively coupled to each other. Each of the plurality of communication flow paths 312b overlaps with one nozzle N corresponding to the communication flow path 312b in plan view.

The pressure chamber substrate 313 is a plate-shaped member in which a plurality of pressure chambers Cv called cavities are formed for each of the first nozzle array L1 and the second nozzle array L2. The plurality of pressure chambers Cv are arrayed in the direction along the b-axis. Each pressure chamber Cv is a long space formed for each nozzle N and extending in the direction along the a-axis in plan view. Each of the flow path substrate 312 and the pressure chamber substrate 313 is manufactured by processing a silicon single crystal substrate by, for example, a semiconductor manufacturing technology in the same manner as the nozzle plate 314 described above. However, other known methods and materials may be appropriately used for manufacturing the flow path substrate 312 and the pressure chamber substrate 313.

The pressure chamber Cv is a space positioned between the flow path substrate 312 and the vibration plate 316. The plurality of pressure chambers Cv are arrayed in the direction along the b-axis for each of the first nozzle array L1 and the second nozzle array L2. The pressure chamber Cv is communicatively coupled to each of the communication flow paths 312b and the supply flow paths 312a. Accordingly, the pressure chamber Cv is communicatively coupled to the nozzle N via the communication flow path 312b and is communicatively coupled to the space Ra via the supply flow path 312a and the supply liquid chamber 312c.

The vibration plate 316 is disposed on a surface of the pressure chamber substrate 313 facing the c2 direction. The vibration plate 316 is a plate-shaped member that can vibrate elastically. The vibration plate 316 has, for example, an elastic film made of silicon oxide ($SiO_2$) and an insulating film made of zirconium oxide ($ZrO_2$), and these films are stacked. The elastic film is formed, for example, by thermally oxidizing one surface of a silicon single crystal substrate. The insulating film is formed by, for example, forming a zirconium layer by a sputtering method and thermally oxidizing the layer.

The plurality of piezoelectric elements 311 respectively corresponding to each nozzle N are arranged on a surface of the vibration plate 316 facing the c1 direction for each of the first nozzle array L1 and the second nozzle array L2. Each piezoelectric element 311 is a passive element deformed by the supply of the above-described drive pulse PD. Each piezoelectric element 311 has a long shape extending in the direction along the a-axis in plan view. The plurality of piezoelectric elements 311 are arrayed in the direction along the b-axis so as to correspond to the plurality of pressure chambers Cv. When the vibration plate 316 vibrates in conjunction with the deformation of the piezoelectric element 311, the pressure in the pressure chamber Cv fluctuates, and thus, the ink is discharged from the nozzle N in the c2 direction.

The housing 318 is a case for reserving the ink to be supplied to the plurality of pressure chambers Cv. As illustrated in FIG. 4, a space Rb is formed in the housing 318 of the present embodiment for each of the first nozzle array L1 and the second nozzle array L2. The space Rb of the housing 318 and the space Ra of the flow path substrate 312 are communicatively coupled to each other. A space formed by the space Ra and the space Rb functions as a liquid reservoir R for reserving the ink to be supplied to the plurality of pressure chambers Cv. The Ink is supplied to the liquid reservoir R via an introduction port 318a formed in the housing 318. The ink in the liquid reservoir R is supplied to the pressure chamber Cv via the supply liquid chamber 312c and each supply flow path 312a. The vibration absorber 315 is a flexible film (compliance substrate) constituting a wall surface of the liquid reservoir R, and absorbs a pressure fluctuation in the ink in the liquid reservoir R.

The wiring substrate 317 is a plate-shaped member in which wirings for electrically coupling the drive circuit 340 and the plurality of piezoelectric elements 311 are formed. A surface of the wiring substrate 317 facing the c2 direction is joined to the vibration plate 316 via a plurality of conductive bumps T. On the other hand, the drive circuit 340 is mounted on a surface of the wiring substrate 317 facing the c1 direction.

The drive circuit 340 is an integrated circuit (IC) chip that outputs a drive signal and a reference voltage for driving each piezoelectric element 311. Specifically, the drive circuit 340 switches whether or not to supply, as the drive pulse PD, the drive signal Com for each of the plurality of piezoelectric elements 311 based on the above-mentioned control signal SI.

Although not illustrated, an end portion of an external wiring electrically coupled to the control device 600 is joined to the surface of the wiring substrate 317 facing the c1 direction. The external wiring includes, for example, coupling components such as flexible printed circuits (FPC) or Flexible Flat Cable (FFC). The wiring substrate 317 may be the FPC, the FFC, or the like.

Figure 5:
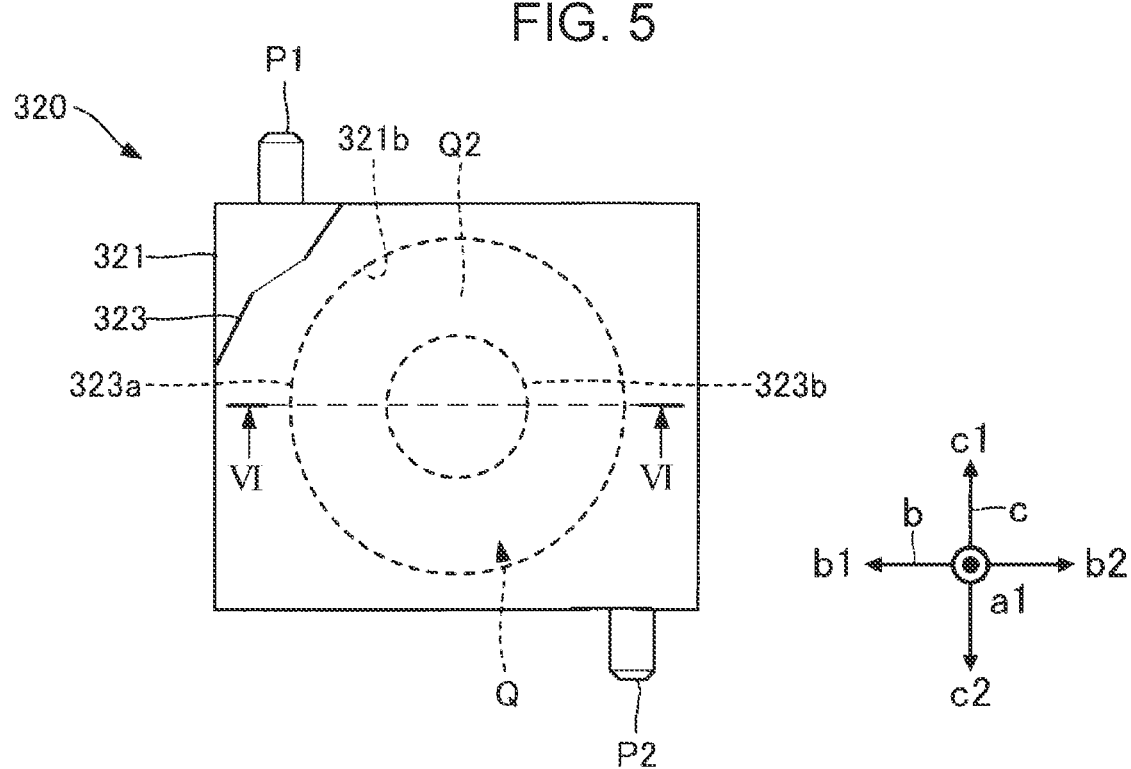
FIG. 5 is a plan view illustrating a configuration example of a pressure adjustment valve according to the first embodiment.
Figure 6:
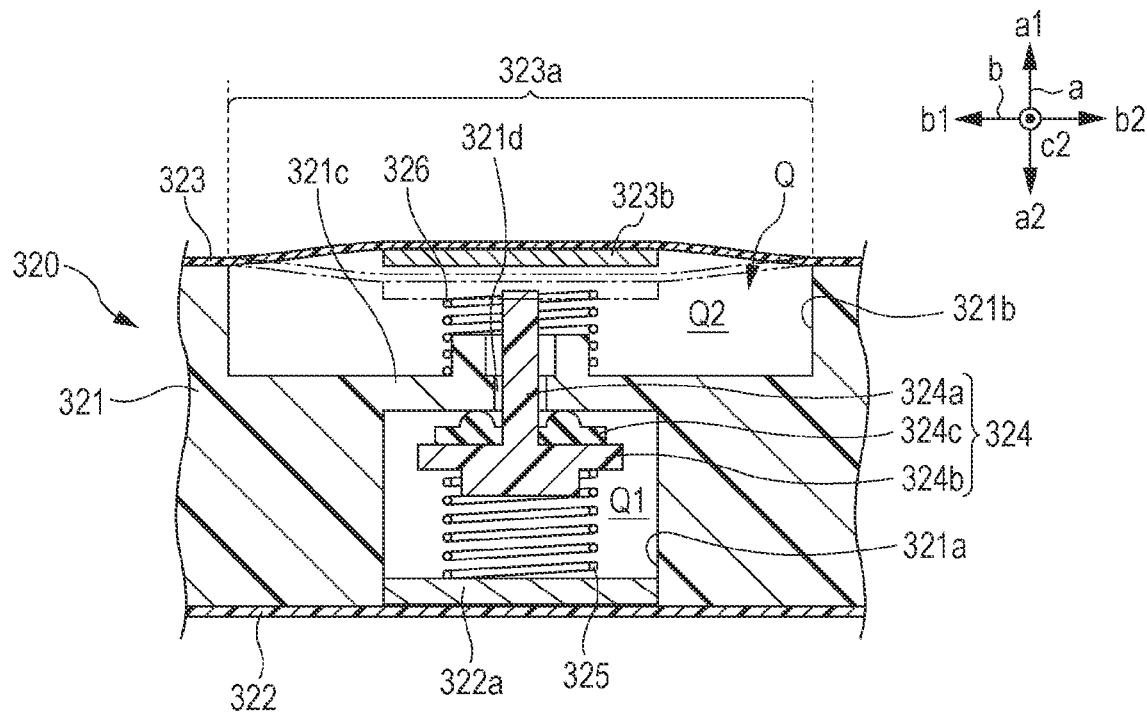
FIG. 6 is a sectional view taken along a line VI-VI in FIG. 5.

FIG. 5 is a plan view illustrating a configuration example of the pressure adjustment valve 320 according to the first embodiment. FIG. 6 is a sectional view taken along a line VI-VI in FIG. 5. The pressure adjustment valve 320 is a valve mechanism that opens and closes according to the pressure of the ink in the liquid discharge head 310. By this opening and closing, the pressure of the ink in the liquid discharge head 310 is maintained at a negative pressure within a predetermined range. Thus, a meniscus of the ink formed in the nozzle N of the liquid discharge head 310 is stabilized. As a result, it is possible to prevent air bubbles from entering the nozzle N and the ink from overflowing from the nozzle N.

As illustrated in FIG. 6, the pressure adjustment valve 320 has a flow path member 321, a sealing member 322, a sealing member 323, a valve body 324, an urging member 325, and an urging member 326.

The flow path member 321 is a structure having a flow path Q for communicatively coupling the upstream flow path 510 and the downstream flow path 520 in the above-mentioned supply flow path 500. The flow path member 321 is made of, for example, a resin material such as polypropylene, and is formed by injection molding or the like. As illustrated in FIG. 5, a supply port P1 and a discharge port P2 are provided in the flow path member 321. The supply port P1 and the discharge port P2 are communicatively coupled to each other via the flow path Q. The upstream flow path 510 is coupled to the supply port P1. The downstream flow path 520 is coupled to the discharge port P2.

As illustrated in FIG. 6, the flow path Q has an upstream liquid chamber Q1 and a downstream liquid chamber Q2. The upstream liquid chamber Q1 is a space communicatively coupled to the above-mentioned supply port P1 via a flow path (not illustrated). On the other hand, the downstream liquid chamber Q2 is a space communicatively coupled to the above-mentioned discharge port P2 via a flow path (not illustrated).

In the examples illustrated in FIGS. 5 and 6, an outer shape of the flow path member 321 is substantially a plate shape with the a1 direction or the a2 direction as a thickness direction, and the upstream liquid chamber Q1 and the downstream liquid chamber Q2 are arranged in the thickness direction of the flow path member 321. Here, a recess portion 321a for forming the upstream liquid chamber Q1 is provided on a surface of the flow path member 321 facing the a2 direction. On the other hand, a recess portion 321*b* for forming the downstream liquid chamber Q2 is provided on a surface of the flow path member 321 facing the a1 direction.

Shapes of the upstream liquid chamber Q1 and the downstream liquid chamber Q2 are circular shapes in plan view in the a1 direction or the a2 direction, respectively. In the example illustrated in FIG. 6, an area of the downstream liquid chamber Q2 in plan view is larger than an area of the upstream liquid chamber Q1 in plan view. The shapes or sizes of the upstream liquid chamber Q1 and the downstream liquid chamber Q2 are not limited to the examples illustrated in FIGS. 5 and 6, and are any shapes or sizes.

A valve seat 321*c* is provided between the upstream liquid chamber Q1 and the downstream liquid chamber Q2 in the flow path member 321. The valve seat 321*c* is a partition wall that separates the upstream liquid chamber Q1 and the downstream liquid chamber Q2, and constitutes bottoms of the above-described recess portions 321*b* and 321*a*. In other words, the valve seat 321*c* divides the flow path Q into the upstream liquid chamber Q1 and a downstream liquid chamber Q2. A hole 321*d* is provided in the valve seat 321*c*. The hole 321*d* extends in the a1 direction or the a2 direction, and is communicatively coupled to the upstream liquid chamber Q1 and the downstream liquid chamber Q2.

The sealing member 322 is a member joined to the flow path member 321 by fusion, adhesion, or the like so as to close an opening of the above-described recess portion 321*a*. The sealing member 322 is made of, for example, a resin material such as polypropylene (PP) or polyphenylene sulfide (PPS). The sealing member 322 has a portion 322*a* constituting a part of a wall surface of the upstream liquid chamber Q1. A rigidity of the portion 322*a* is higher than a rigidity of the sealing member 322. Preferably, the portion 322*a* has a rigidity so as not to be substantially deformed by the pressure fluctuation in the ink in the upstream liquid chamber Q1.

The sealing member 323 is a sheet-like member joined to the flow path member 321 by fusion, adhesion, or the like so as to close the opening of the above-described recess portion 321*b*. The sealing member 323 is made of, for example, a resin material such as polypropylene (PP) or polyphenylene sulfide (PPS). The sealing member 323 has a flexible portion 323*a* which is a portion constituting a part of a wall surface of the downstream liquid chamber Q2. The flexible portion 323*a* has flexibility that bends and deforms according to the pressure of the ink in the downstream liquid chamber Q2.

Here, the flexible portion 323*a* separates a space open to an atmosphere from the downstream liquid chamber Q2. The pressure of the ink in the downstream liquid chamber Q2 becomes lower than an atmospheric pressure at the flexible portion 323*a*, and thus, a force toward the downstream liquid chamber Q2 is applied. In the example illustrated in FIG. 6, a pressure receiving plate 323*b* is provided at a central portion of the flexible portion 323*a*. The pressure receiving plate 323*b* is made of, for example, a resin material such as polypropylene (PP) or polyphenylene sulfide (PPS). The pressure receiving plate 323*b* may be integrally formed with the flexible portion 323*a*, or may be formed separately from the flexible portion 323*a*. The pressure receiving plate 323*b* may be provided as needed, may be fixed to the valve body 324, or may be omitted.

The valve body 324 has a shaft portion 324*a*, a flange portion 324*b*, and a sealing portion 324*c*. The shaft portion 324*a* and the flange portion 324*b* are made of, for example, a resin material such as polypropylene (PP) or polyphenylene sulfide (PPS), and are integrally formed by injection molding or the like.

The shaft portion 324*a* extends in the a1 direction or the a2 direction and is inserted into the hole 321*d*. A width of the shaft portion 324*a* is smaller than the width of the hole 321*d*. Thus, the movement of the shaft portion 324*a* in the a1 direction or the a2 direction is allowed, and a gap that allows the ink to flow is formed between an outer peripheral surface of the shaft portion 324*a* and an inner peripheral surface of the hole 321*d*. An end of the shaft portion 324*a* in the a1 direction is disposed in the downstream liquid chamber Q2 and comes into contact with the pressure receiving plate 323*b*. On the other hand, an end of the shaft portion 324*a* in the a2 direction is disposed in the upstream liquid chamber Q1.

The flange portion 324*b* is provided at the end of the shaft portion 324*a* in the a2 direction, and is disposed in the upstream liquid chamber Q1. A width of the flange portion 324*b* is larger than the width of the hole 321*d* and is smaller than a width of the upstream liquid chamber Q1 or the recess portion 321*a*. Since the width of the flange portion 324*b* is larger than the width of the hole 321*d*, the flange portion 324*b* can have the sealing portion 324*c* interposed between the flange portion and the valve seat 321*c*. Since the width of the flange portion 324*b* is smaller than the width of the recess portion 321*a*, the movement of the flange portion 324*b* in the a1 direction or the a2 direction is allowed, and a gap that allows the ink to flow is formed between an outer peripheral surface of the flange portion 324*b* and an inner peripheral surface of the recess portion 321*a*.

The sealing portion 324*c* is disposed on a surface of the flange portion 324*b* so as to have a portion interposed between the valve seat 321*c* and the flange portion 324*b*. The sealing portion 324*c* is a member having elasticity, and is made of, for example, a silicon-based or fluorine-based rubber material or an elastomer material.

The urging member 325 is an elastic body disposed in the upstream liquid chamber Q1 and urging the valve body 324 toward the valve seat 321*c*. In the example illustrated in FIG. 6, the urging member 325 is a coil spring and is disposed between the valve body 324 and the sealing member 322 in a state of being compressed and deformed. Although a width of the coil spring is constant in the example illustrated in FIG. 6, the present disclosure is not limited thereto, and for example, the width of the coil spring may increase from one end to the other end. The urging member 325 can urge the valve body 324 toward the valve seat 321*c*, the urging member is not limited to the coil spring, and may be, for example, a leaf spring or the like.

The urging member 326 is an elastic body that is disposed in the downstream liquid chamber Q2 and adjusts the ease of bending and deformation of the flexible portion 323*a*. In the example illustrated in FIG. 6, the urging member 326 is a coil spring and is disposed between the valve seat 321*c* and the pressure receiving plate 323*b*. Although a width of the coil spring is constant in the example illustrated in FIG. 6, the present disclosure is not limited thereto, and for example, the width of the coil spring may increase from one end to the other end. The urging member 326 is not limited to the coil spring, and may be, for example, a leaf spring or the like. The urging member 326 may be provided as needed or may be omitted.

In the above pressure adjustment valve 320, in a normal state in which the pressure of the ink in the downstream liquid chamber Q2 is maintained at a negative pressure within a predetermined range, the sealing portion 324*c* comes into close contact with the valve seat 321c by an urging force of the urging member 325, and thus, the upstream liquid chamber Q1 and the downstream liquid chamber Q2 are shut off. That is, the flow path Q is blocked in the normal state.

On the other hand, when the negative pressure of the ink in the downstream liquid chamber Q2 rises a predetermined value or more due to the discharge of the ink by the liquid discharge head 310 or the like, the pressure receiving plate 323b displaces the valve body 324 against the urging force of the urging member 325 and the urging member 326 with the bending and deformation of the flexible portion 323a as illustrated by the dashed double-dotted line in FIG. 6. As a result, a gap is formed between the sealing portion 324c and the valve seat 321c, and thus, the upstream liquid chamber Q1 and the downstream liquid chamber Q2 are communicatively coupled to each other via the hole 321d. That is, the flow path Q is opened.

When the flow path Q is opened, the ink from the liquid reservoir 400 is supplied from the upstream liquid chamber Q1 to the downstream liquid chamber Q2 via the hole 321d. Along with this supply, the negative pressure of the ink in the downstream liquid chamber Q2 decreases. As a result, the sealing portion 324c comes into close contact with the valve seat 321c again by the urging force of the urging member 325, and thus, the upstream liquid chamber Q1 and the downstream liquid chamber Q2 are shut off. As described above, the pressure adjustment valve 320 opens and closes according to the pressure of the ink in the liquid discharge head 310, and thus, the pressure of the ink in the downstream liquid chamber Q2 is maintained at a negative pressure within a predetermined range.

As described above, the three-dimensional object printing apparatus 100 includes the liquid discharge head 310, the robot 200 which is an example of the moving mechanism, and the control device 600 which is an example of the controller. Here, the liquid discharge head 310 has the nozzle surface F on which the plurality of nozzles N for discharging the ink which is an example of the liquid are formed. The robot 200 changes the position and the pose of the liquid discharge head 310 relative to the three-dimensional workpiece W. The control device 600 controls the driving of each of the liquid discharge head 310 and the robot 200.

Here, as described above, the workpiece W has the first surface WF1 and the second surface WF2 that forms the corner WC bent or curved in the concave shape between the first surface WF1 and the first surface WF1. The control device 600 executes a first printing operation in order to print the first surface WF1 over a range including the corner WC or the vicinity thereof. The first printing operation is an operation of printing on the first surface WF1 with the movement of the liquid discharge head 310 in a direction along the first surface WF1. The control device 600 executes a second printing operation in order to print the second surface WF2 over the range including the corner WC or the vicinity thereof. The second printing operation is an operation of printing on the second surface WF2 with the movement of the liquid discharge head 310 in a direction along the second surface WF2. Hereinafter, the first printing operation and the second printing operation will be described in detail.

Figure 7:
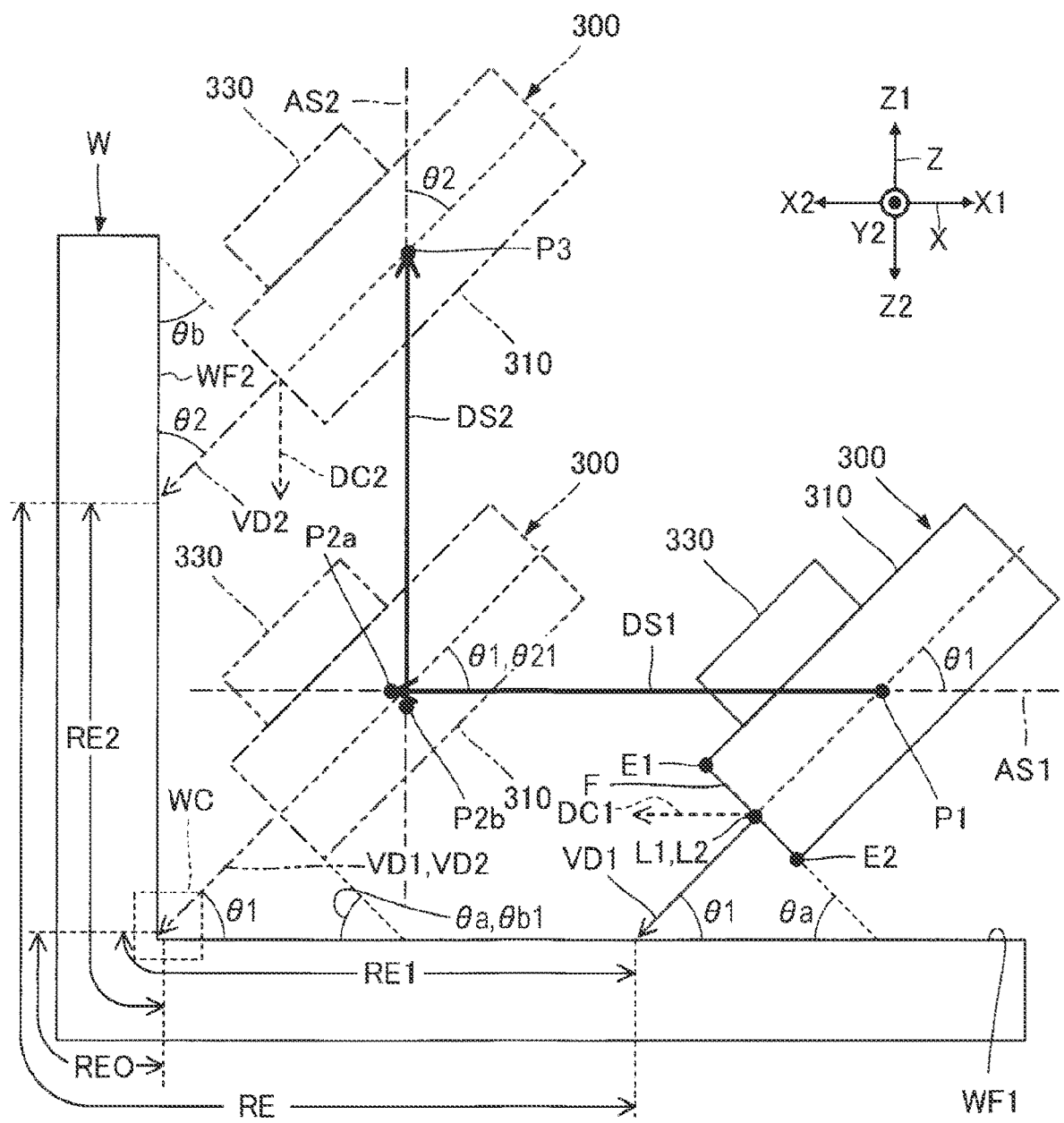
FIG. 7 is a diagram illustrating a first printing operation and a second printing operation in the first embodiment.
Figure 8:
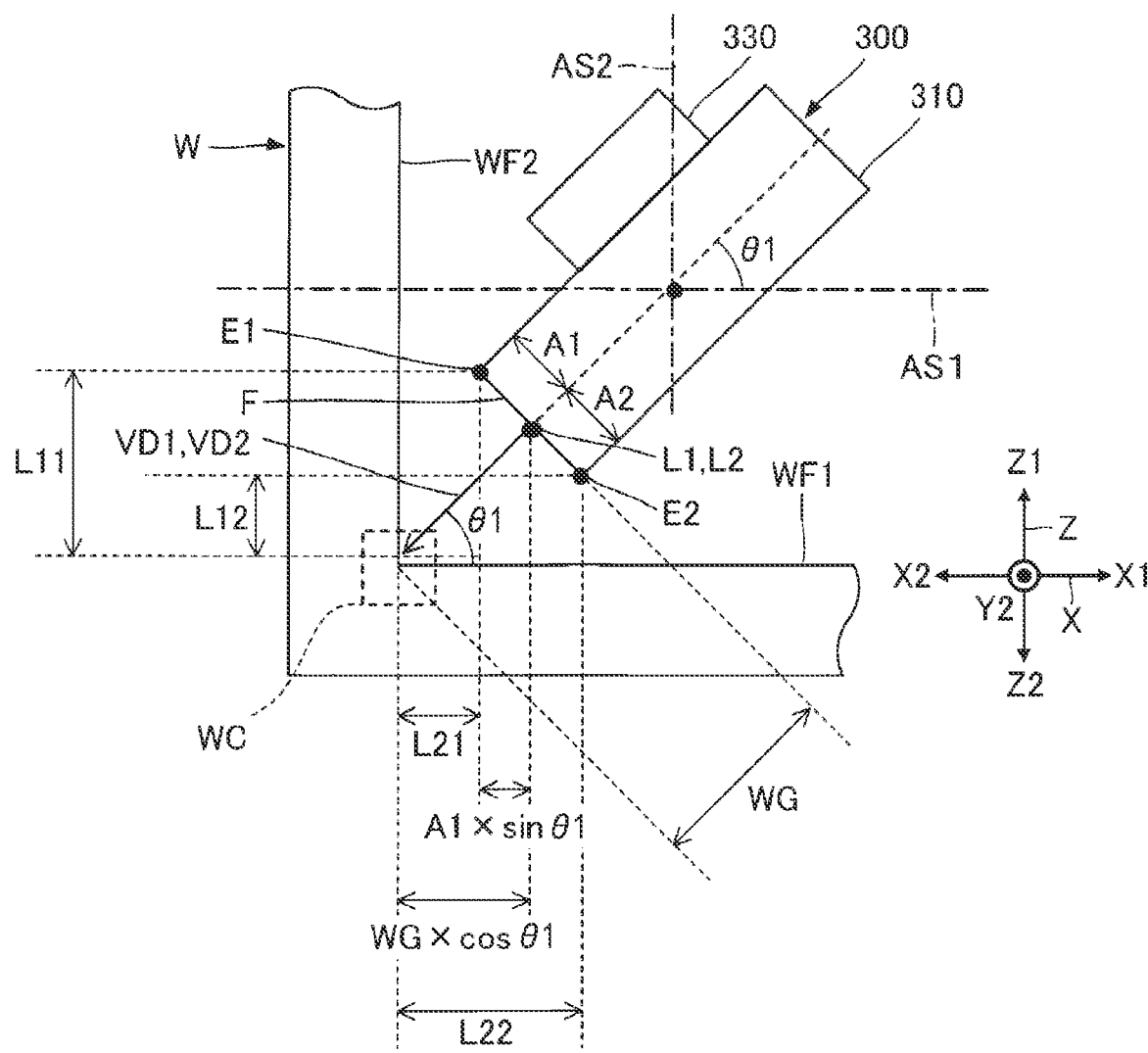
FIG. 8 is a diagram illustrating a pose of the liquid discharge head.

1-4. Operation of Three-dimensional Object Printing Apparatus and Three-dimensional Object Printing Method FIG. 7 is a diagram illustrating the first printing operation and the second printing operation in the first embodiment. FIG. 8 is a diagram illustrating the pose of the liquid discharge head 310. FIG. 7 illustrates a change in the position of the liquid discharge head unit 300 when printing is performed on the first surface WF1 and the second surface WF2 of the workpiece W over a range including the corner WC. In FIG. 7, the pose of the liquid discharge head unit 300 in each of the first printing operation and the second printing operation is constant, and the first nozzle array L1 and the second nozzle array L2 are parallel to the Y-axis. More specifically, in FIG. 7, the c2 direction is orthogonal to the Y-axis and is a direction between the X2 direction and the Z2 direction. The a2 direction is orthogonal to the Y-axis and is a direction between the X2 direction and the Z1 direction. The b-axis is parallel to the Y-axis. Although a center position of the liquid discharge head 310 is illustrated as the position of the liquid discharge head 310 in FIG. 7, a position of any portion of the liquid discharge head 310 may be regarded as the position of the liquid discharge head 310.

In the first printing operation of the present embodiment, the ink is discharged from the liquid discharge head 310 while moving the liquid discharge head unit 300 from a position P1 to a position P2a along the first surface WF1 as illustrated in FIG. 7, and thus, the printing is performed in a region RE1 including a region of the first surface WF1.

The position P1 is the position of the liquid discharge head 310 at which a printing position using the liquid discharge head 310 is any position on the first surface WF1. The position P2a is the position of the liquid discharge head 310 at which the printing position using the liquid discharge head 310 is at the corner WC or the vicinity thereof. In the example illustrated in FIG. 7, the position P2a is the position of the liquid discharge head 310 at which the printing position using the liquid discharge head 310 is near the corner WC on the second surface WF2.

In the first printing operation, the control device 600 controls the driving of the robot 200 such that a first discharge vector VD1 has a component DC1 in a direction toward the second surface WF2 along a first scanning axis AS1. Here, as described above, the first scanning axis AS1 is an axis along a scanning direction DS1 of the liquid discharge head 310 with respect to the workpiece W in the first printing operation of printing on the first surface WF1. Typically, the first scanning axis AS1 is an axis parallel to the first surface WF1. The first discharge vector VD1 is a normal vector of the nozzle surface F in the first printing operation. when viewed along the first scanning axis AS1, at least a part or all the nozzle surface F overlaps with the second surface WF2 in the first printing operation.

As described above, the control device 600 executes the first printing operation of printing on the first surface WF1 in a state in which the nozzle surface F is tilted with respect to the first surface WF1. Here, as illustrated in FIGS. 7 and 8, the nozzle surface F includes the first nozzle array L1 and the second nozzle array L2 which are examples of the nozzles including the plurality of arrayed nozzles N, the first end E1 in a direction intersecting the array direction of the plurality of nozzles N, and the second end E2 on a side opposite to the first end E1. As illustrated in FIG. 8, in the first printing operation, a distance L11 between the first end E1 and the first surface WF1 is larger than a distance L12 between the second end E2 and the first surface WF1, and a distance L21 between the first end E1 and the second surface WF2 is smaller than a distance L22 between the second end E2 and the second surface WF2.

In such a first printing operation, the ink discharged from the first nozzle array L1 or the second nozzle array L2 passes over the first end E1 of the liquid discharge head 310 in the X2 direction and lands on a workpiece surface which is the printing position. Thus, printing can be performed on the first surface WF1 over the range including the corner WC or the vicinity thereof without the liquid discharge head 310 coming into contact with the workpiece W.

Here, in the first printing operation, as illustrated in FIG. 8, when a distance between the second end E2 and the first nozzle array L1 or the second nozzle array L2 is A2, a distance between the first nozzle array L1 or the second nozzle array L2 and the first surface WF1 in the normal direction of the nozzle surface F is WG, and an angle formed by the normal direction of the nozzle surface F and the first surface WF1 is θ1, the control device 600 controls the driving of the robot 200 so as to satisfy A2≤WG×tan θ1. Thus, during the first printing operation, the second end E2 of the liquid discharge head 310 positioned at a position closest to the first surface WF1 is prevented from coming into contact with the first surface WF1.

In the first printing operation, as illustrated in FIG. 8, when a distance between the first end E1 and the first nozzle array L1 or the second nozzle array L2 is A1, a distance between the first nozzle array L1 or the second nozzle array L2 and the first surface WF1 in the normal direction of the nozzle surface F is WG, and an angle formed by the normal direction of the nozzle surface F and the first surface WF1 is θ1, the control device 600 controls the driving of the robot 200 so as to satisfy A1×sin θ1≤WG×cos θ1. A1, A2 and WG are defined as distances when viewed along the first nozzle array L1 or the second nozzle array L2.

Here, an ideal printing position in the first printing operation is an intersection of the first discharge vector VD1 and the workpiece W. When the robot 200 is driven so as to satisfy A1×sin θ1≤WG×cos θ1, the ink discharged from the first nozzle array L1 or the second nozzle array L2 passes over the first end E1 of the liquid discharge head 310 in the X2 direction, and lands on the workpiece surface which is the printing position. Thus, the first surface WF1 can be printed over the range including the corner WC or the vicinity thereof while preventing the first end E1 of the liquid discharge head 310 from coming into contact with the second surface WF2 during the first printing operation.

In the present embodiment, the control device 600 moves the liquid discharge head 310 relative to the workpiece W in a direction approaching the second surface WF2 in the first printing operation. Thus, when printing is performed on the second surface WF2 subsequently to printing on the first surface WF1 as in the present embodiment, a moving path of the liquid discharge head 310 can be shortened as compared with an operation of moving the liquid discharge head 310 relative to the workpiece W in a direction away from the second surface WF2.

On the other hand, in the second printing operation of the present embodiment, as illustrated in FIG. 7, the ink is discharged from the liquid discharge head 310 while moving the liquid discharge head unit 300 from a position P2b to a position P3 along the second surface WF2, and thus, printing is performed in a region RE2 including a region of the second surface WF2.

The position P2b is the position of the liquid discharge head 310 at which the printing position using the liquid discharge head 310 is at the corner WC or the vicinity thereof. In the example illustrated in FIG. 7, the position P2b is the position of the liquid discharge head 310 at which the printing position using the liquid discharge head 310 is near the corner WC on the first surface WF1. Thus, the region RE2 has a portion that overlaps with the above-mentioned region RE1 in a region REO. Accordingly, for example, even when an error occurs in the movement of the liquid discharge head 310, it is possible to prevent printing defects, so-called white streaks in which printing is not performed in the region REO at all, and it is possible to improve the image quality of a joint between an image formed by the first printing operation and an image formed by the second printing operation in the region RE including the region RE1 and the region RE2. The position P3 is the position of the liquid discharge head 310 at which the printing position using the liquid discharge head 310 is any position on the second surface WF2.

In the second printing operation, the control device 600 controls the driving of the robot 200 such that a second discharge vector VD2 has a component DC2 in a direction toward the first surface WF1 along a second scanning axis AS2. Here, the second scanning axis AS2 is an axis along a scanning direction DS2 of the liquid discharge head 310 with respect to the workpiece W in the second printing operation of printing on the second surface WF2. Typically, the second scanning axis AS2 is an axis parallel to the second surface WF2. The second discharge vector VD2 is a normal vector of the nozzle surface F in the second printing operation. when viewed along the second scanning axis AS2, at least a part or all the nozzle surface F overlaps with the first surface WF1 in the second printing operation.

As described above, the control device 600 executes the second printing operation of printing on the second surface WF2 in a state in which the nozzle surface F is tilted with respect to the second surface WF2. In the second printing operation, as illustrated in FIG. 8, the distance L21 between the first end E1 and the second surface WF2 is smaller than the distance L22 between the second end E2 and the second surface WF2, and the distance L11 between the first end E1 and the first surface WF1 is larger than the distance L12 between the second end E2 and the first surface WF1.

In such a second printing operation, the ink discharged from the first nozzle array L1 or the second nozzle array L2 passes over the second end E2 of the liquid discharge head 310 in the Z2 direction and lands on the workpiece surface which is the printing position. Thus, printing can be performed on the second surface WF2 over the range including the corner WC or the vicinity thereof without the liquid discharge head 310 coming into contact with the workpiece W. Accordingly, the first printing operation and the second printing operation are combined, and thus, printing can be performed on the first surface WF1 and the second surface WF2 over the range including the corner WC without the liquid discharge head 310 coming into contact with the workpiece W.

In the present embodiment, the control device 600 moves the liquid discharge head 310 relative to the workpiece W in the direction away from the first surface WF1 in the second printing operation. Thus, when printing is performed on the second surface WF2 subsequently to printing on the first surface WF1 as in the present embodiment, the liquid discharge head 310 is continuously moved along the first surface WF1 and the second surface WF2 in sequence, and thus, printing can be performed on the first surface WF1 and the second surface WF2. Accordingly, the moving path of the liquid discharge head 310 can be shortened as compared with an operation of moving the liquid discharge head 310 relative to the workpiece W in a direction approaching the first surface WF1.

Here, the control device 600 sets the angle θ1 formed by the first scanning axis AS1 and the first discharge vector VD1 and an angle θ21 formed by the first scanning axis AS1 and the second discharge vector VD2 to be equal to each other. Accordingly, an inclination angle θa of the nozzle surface F with respect to the first surface WF1 in the first printing operation and an inclination angle θb1 of the nozzle surface F with respect to the first surface WF1 in the second printing operation are equal to each other. That is, the pose of the liquid discharge head 310 is the same between the first printing operation and the second printing operation. Thus, the driving control of the robot 200 becomes simpler as compared with a case where the pose of the liquid discharge head 310 needs to be changed.

In the present embodiment, the control device 600 adjusts the angle formed by the first scanning axis AS1 and the first discharge vector VD1 or the second discharge vector VD2 such that the angle θ1 formed by the first scanning axis AS1 and the first discharge vector VD1 and the angle θ2 formed by the second scanning axis AS2 and the second discharge vector VD2 are equal to each other. That is, the inclination angle θa of the nozzle surface F with respect to the first surface WF1 in the first printing operation and an inclination angle θb of the nozzle surface F with respect to the second surface WF2 in the second printing operation are equal to each other. Thus, printing can be performed under the same or similar conditions in the first printing operation and the second printing operation, and the adjustment of the image quality and the like is easy.

In the present embodiment, since the first surface WF1 and the second surface WF2 are surfaces extending in directions orthogonal to each other, even though the pose of the liquid discharge head 310 is the same between the first printing operation and the second printing operation, the inclination angle θa of the nozzle surface F with respect to the first surface WF1 in the first printing operation and the inclination angle θb of the nozzle surface F with respect to the second surface WF2 in the second printing operation can be equal to each other. Here, each of the inclination angle θa and the inclination angle θb is 45°. In the present embodiment, each of the above-mentioned angle θ1, angle θ2, angle θ21, and inclination angle θb1 is 45°.

2. Second Embodiment

Hereinafter, a second embodiment of the present disclosure will be described. Elements of which actions and functions are the same as those of the first embodiment in forms to be illustrated below will be assigned by the reference numerals used in the description of the first embodiment, and the detailed description of each element will be omitted as appropriate.

Figure 9:
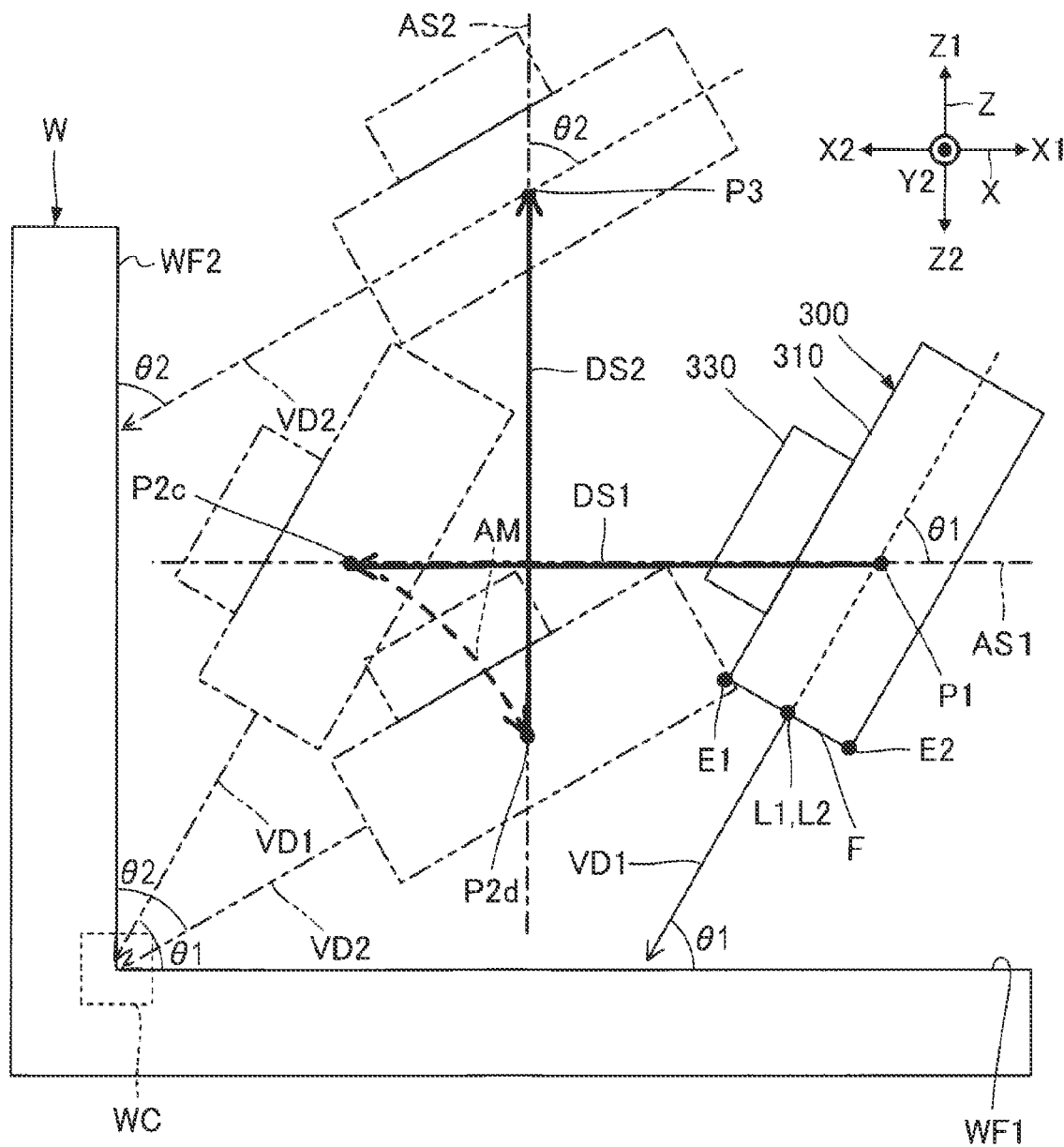
FIG. 9 is a diagram illustrating a first printing operation and a second printing operation in a second embodiment.

FIG. 9 is a diagram illustrating a first printing operation and a second printing operation in a second embodiment. The present embodiment has the same as the above-described first embodiment except that the pose of the liquid discharge head 310 is different between the first printing operation and the second printing operation and an angle adjustment operation of changing the pose of the liquid discharge head 310 is executed in a period between the first printing operation and the second printing operation.

In the first printing operation of the present embodiment, as illustrated in FIG. 9, the ink is discharged from the liquid discharge head 310 while moving the liquid discharge head unit 300 from the position P1 to a position P2c along the first surface WF1, and thus, printing is performed in the region RE1 including the region of the first surface WF1.

The position P2c is the position of the liquid discharge head 310 at which the printing position using the liquid discharge head 310 is at the corner WC or the vicinity thereof. In the example illustrated in FIG. 9, the position P2c is the position of the liquid discharge head 310 where the printing position by the liquid discharge head 310 is near the corner WC on the second surface WF2.

On the other hand, in the second printing operation of the present embodiment, as illustrated in FIG. 9, the ink is discharged from the liquid discharge head 310 while moving the liquid discharge head unit 300 from a position P2d to the position P3 along the second surface WF2, and thus, printing is performed on in the region RE2 including the region of the second surface WF2.

The position P2d is the position of the liquid discharge head 310 at which the printing position by the liquid discharge head 310 is at the corner WC or the vicinity thereof. In the example illustrated in FIG. 9, the position P2d is the position of the liquid discharge head 310 at which the printing position using the liquid discharge head 310 is near the corner WC on the first surface WF1.

In the angle adjustment operation, as illustrated in FIG. 9, the pose of the liquid discharge head unit 300 is changed from the pose in the first printing operation to the pose in the second printing operation while moving the liquid discharge head unit 300 from the position P2c to the position P2d. In FIG. 9, a path AM which is an example of the moving path of the liquid discharge head unit 300 from the position P2c to the position P2d is illustrated by a broken line.

As described above, the control device 600 executes the angle adjustment operation of adjusting the inclination angle θa of the nozzle surface F with respect to the first surface WF1 or the inclination angle θb of the nozzle surface F with respect to the second surface WF2 in the period between the first printing operation and the second printing operation. That is, the control device 600 adjusts the angle formed by the first scanning axis AS1 and the first discharge vector VD1 or the second discharge vector VD2 in the period between the first printing operation and the second printing operation. Thus, the inclination angle θa can be set to an angle suitable from the viewpoint of print quality and the like in the first printing operation, and the inclination angle θb can be set to an angle suitable from the viewpoint of print quality and the like in the second printing operation.

In the present embodiment, the control device 600 adjusts the angle formed by the first scanning axis AS1 and the first discharge vector VD1 or the second discharge vector VD2 such that the angle θ1 formed by the first scanning axis AS1 and the first discharge vector VD1 and the angle θ2 formed by the second scanning axis AS2 and the second discharge vector VD2 are equal to each other. That is, the inclination angle θa of the nozzle surface F with respect to the first surface WF1 in the first printing operation and an inclination angle θb of the nozzle surface F with respect to the second surface WF2 in the second printing operation are equal to each other. Thus, printing can be performed under the same or similar conditions in the first printing operation and the second printing operation, and the adjustment of the image quality and the like is easy.

Here, each of the angle θ1 and the angle θ2 is determined according to the shape or size of the liquid discharge head unit 300 or the liquid discharge head 310, but is preferably 45° or more and less than 90° and more preferably, 50° or more and 80° or less from the viewpoint of improving the print quality.

3. Third Embodiment

Hereinafter, a third embodiment of the present disclosure will be described. Elements of which actions and functions are the same as those of the first embodiment in forms to be illustrated below will be assigned by the reference numerals used in the description of the first embodiment, and the detailed description of each element will be omitted as appropriate.

Figure 10:
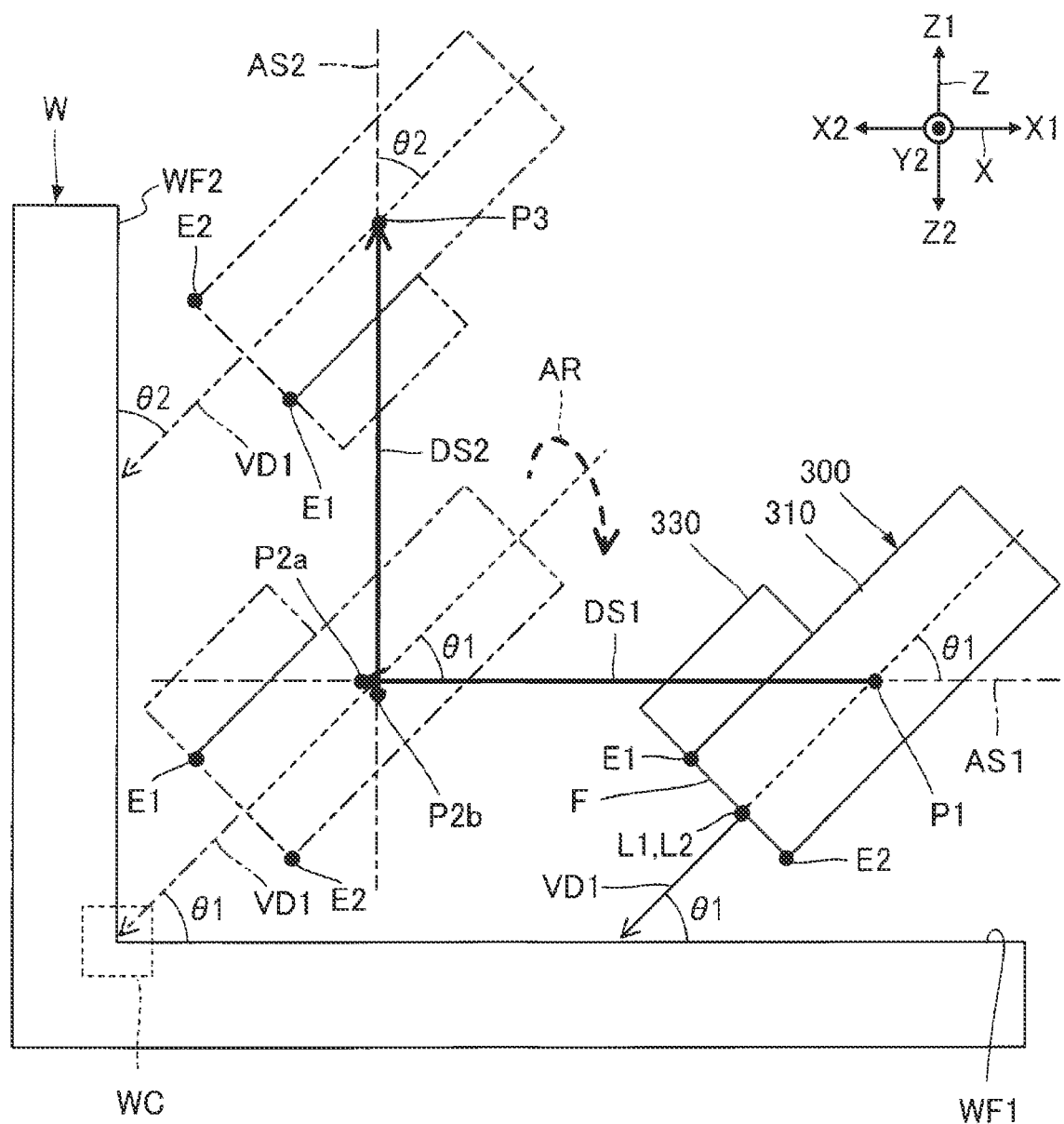
FIG. 10 is a diagram illustrating a first printing operation and a second printing operation in a third embodiment.

FIG. 10 is a diagram illustrating a first printing operation and a second printing operation in a third embodiment. The present embodiment has the same as the above-described first embodiment except that the pose of the liquid discharge head 310 is different between the second printing operation and a rotation operation of changing the pose of the liquid discharge head 310 by rotation is executed in the period between the first printing operation and the second printing operation.

In the rotation operation, the pose of the liquid discharge head unit 300 is rotated by 180° around a central axis along the normal line of the nozzle surface F as illustrated in FIG. 10. Thus, the pose of the liquid discharge head 310 in the second printing operation differs from the pose of the liquid discharge head 310 in the first printing operation by 180° around the central axis. In FIG. 10, a direction AR which is an example of a rotation direction of the rotation operation is illustrated by a broken line.

As described above, in the first printing operation, the control device 600 sets the first end E1 at a position closer to the second surface WF2 than the second end E2. In the second printing operation, the control device 600 sets the first end E1 at a position closer to the first surface WF1 than the second end E2. As stated above, the pose of the liquid discharge head 310 is set to be different between the first printing operation and the second printing operation around the central axis along the normal line of the nozzle surface F, and thus, when the structure such as the displacement sensor 330 is present near the first end E1 of the liquid discharge head 310, the distance WG can be shortened as illustrated in FIG. 10. Thus, it is easy to improve the print quality in both the first printing operation and the second printing operation. On the other hand, in the first printing operation, when the second end E2 is at a position closer to the second surface WF2 than the first end E1, it is necessary to lengthen the distance WG such that the displacement sensor 330 does not come into contact with the first surface WF1. Similarly, in the second printing operation, when the second end E2 is at a position closer to the first surface WF1 than the first end E1, it is necessary to lengthen the distance WG such that the displacement sensor 330 does not come into contact with the second surface WF2.

4. Fourth Embodiment

Hereinafter, a fourth embodiment of the present disclosure will be described. Elements of which actions and functions are the same as those of the first embodiment in forms to be illustrated below will be assigned by the reference numerals used in the description of the first embodiment, and the detailed description of each element will be omitted as appropriate.

Figure 11:
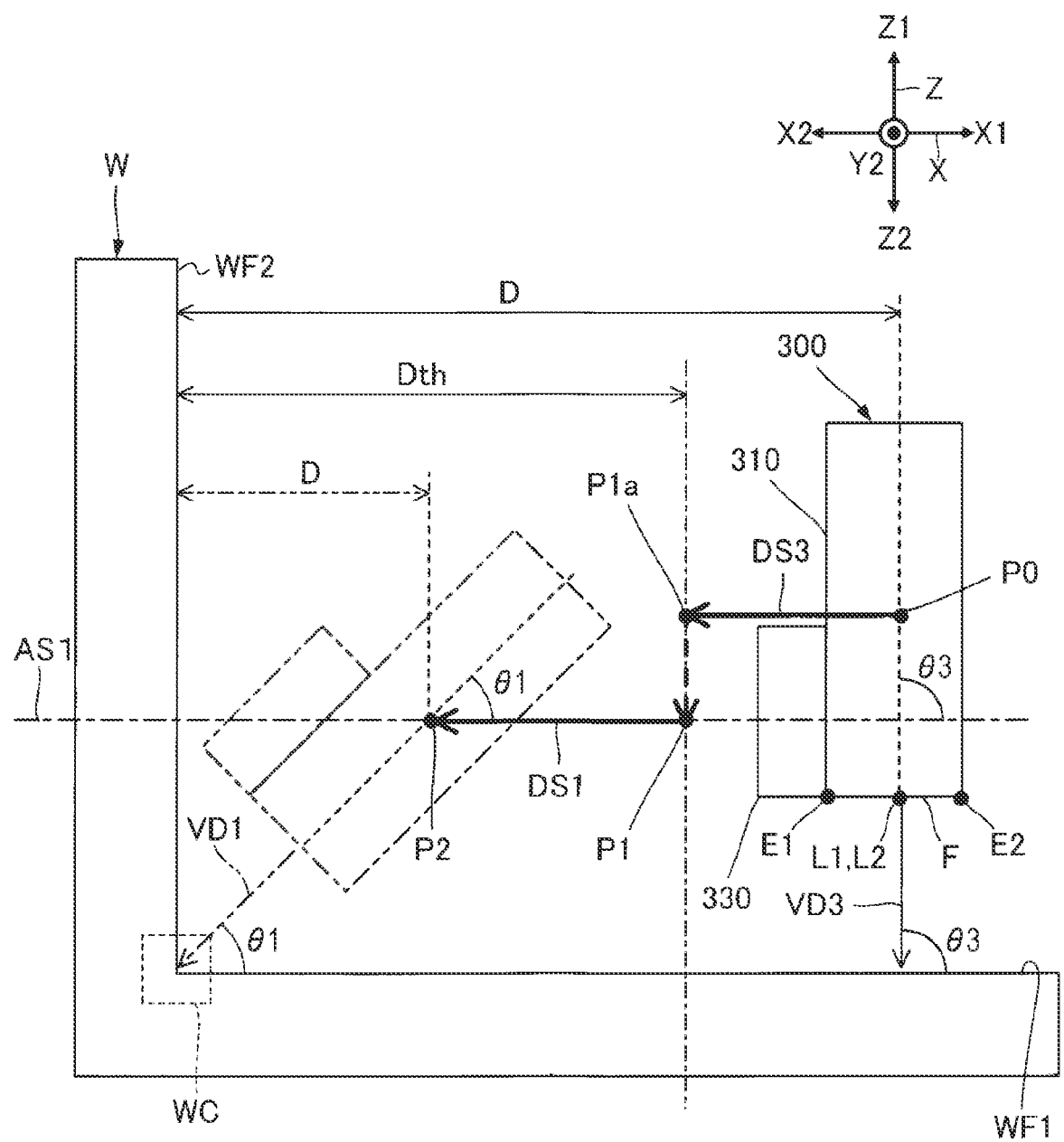
FIG. 11 is a diagram illustrating a third printing operation in a fourth embodiment.

FIG. 11 is a diagram illustrating a third printing operation in a fourth embodiment. The present embodiment is the same as the above-described first embodiment except that printing on the first surface WF1 is performed using not only the first printing operation but also the third printing operation.

In the third printing operation, as illustrated in FIG. 11, the ink is discharged from the liquid discharge head 310 while moving the liquid discharge head unit 300 from a position P0 to a position P1a along the first surface WF1, and thus, printing is performed on the region RE1 including the region of the first surface WF1.

The position P0 is a position farther from the second surface WF2 than the position P1a. The position P1a is a position that overlaps with the position P1 when the first surface WF1 is viewed in plan view and is farther from the first surface WF1 than the position P1.

In the third printing operation, the control device 600 controls the driving of the robot 200 such that the nozzle surface F is parallel to the first surface WF1. In FIG. 11, a scanning direction DS3 which is an example of the moving direction of the liquid discharge head 310 with respect to the workpiece W in the third printing operation is illustrated.

As described above, the control device 600 executes the third printing operation of printing on the first surface WF1 in a state in which the nozzle surface F is not tilted with respect to the first surface WF1. In the third printing operation, the distance L11 between the first end E1 and the first surface WF1 is equal to the distance L12 between the second end E2 and the first surface WF1. That is, in the third printing operation, a third discharge vector VD3 which is the normal vector of the nozzle surface F and the normal vector of the first surface WF1 are parallel or coincide with each other. Thus, in the third printing operation, since a direction of the ink discharged from the liquid discharge head 310 is orthogonal to the first surface WF1, it is easy to improve the print quality even though a printing speed is increased as compared with the first printing operation. Accordingly, the first printing operation and the third printing operation are used in combination, and thus, high-quality printing can be performed on the first surface WF1 at a high speed over the range including the corner WC.

When a distance D between the liquid discharge head 310 and the second surface WF2 is equal to or greater than a predetermined distance Dth in performing printing on the first surface WF1, the control device 600 executes the third printing operation. The control device 600 executes the first printing operation when the distance D is less than the predetermined distance Dth. As stated above, the first printing operation and the third printing operation can be continuously performed by switching between the first printing operation and the third printing operation depending on whether or not the distance D is equal to or greater than the predetermined distance Dth.

Here, it is preferable to reduce a difference between the distance WG in the first printing operation and the distance WG in the third printing operation, and it is more preferable to set the distance WG in the first printing operation and the distance WG in the third printing operation to be equal to each other. In this case, there is an advantage that the image quality and the like can be easily matched between the first printing operation and the third printing operation as compared with the other case.

In the example illustrated in FIG. 11, the pose and the distance WG of the liquid discharge head 310 are changed at the position at which the distance D becomes the predetermined distance Dth. However, in the first printing operation, the pose and distance WG of the liquid discharge head 310 may be changed continuously or stepwisely at the position at which the distance D is less than the predetermined distance Dth.

Although an aspect in which the third printing operation is to print on the first surface WF1 is illustrated in the present embodiment, printing may be similarly performed on the second surface WF2 in a state in which the nozzle surface F is not tilted with respect to the second surface WF2. In this case, the normal vector of the nozzle surface F and the normal vector of the second surface WF2 are parallel or coincide with each other. In this case, the first printing operation and the third printing operation are switched according to the distance between the liquid discharge head 310 and the first surface WF1.

5. Modification Examples

The forms in the above examples can be variously modified. Specific modification aspects applicable to each of the above-mentioned forms are illustrated below. It should be noted that two or more aspects randomly selected from the following examples can be appropriately merged without contradicting each other.

5-1. Modification Example 1

Figure 12:
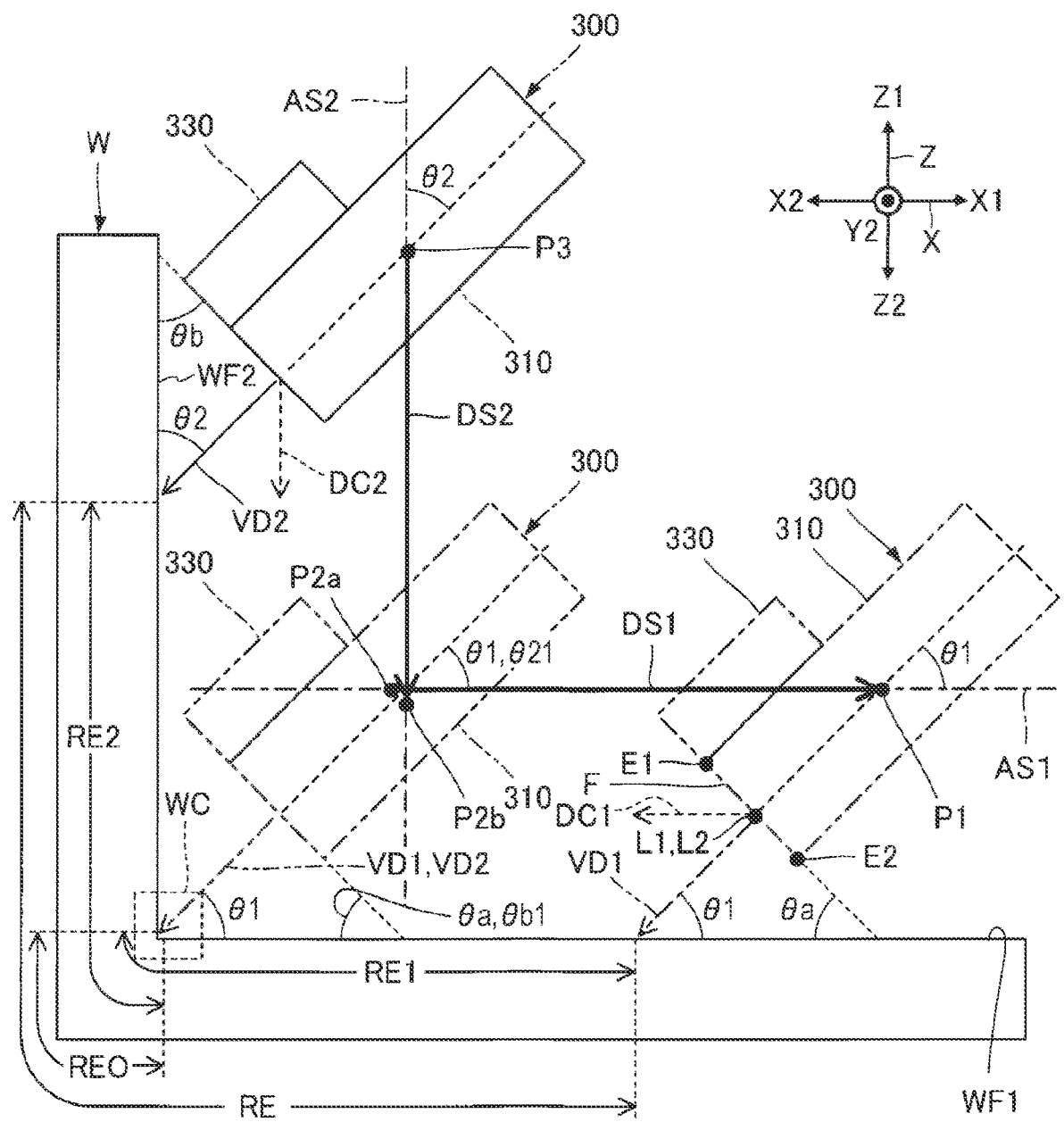
FIG. 12 is a diagram illustrating a first printing operation and a second printing operation in Modification Example 1.

FIG. 12 is a diagram illustrating a first printing operation and a second printing operation in Modification Example 1. Modification Example 1 is the same as the first embodiment except that the moving direction of the liquid discharge head 310 is a direction opposite to that of the first embodiment.

In Modification Example 1, the control device 600 moves the liquid discharge head 310 relative to the workpiece W in the direction away from the second surface WF2 in the first printing operation. In the second printing operation, the control device 600 moves the liquid discharge head 310 relative to the workpiece W in the direction approaching the first surface WF1. When the first printing operation is performed subsequently to the second printing operation, continuous printing can be performed on the first surface WF1 and the second surface WF2 by moving the liquid discharge head 310 in this direction. The same effect as that of the above-described first embodiment is obtained also by the above Modification Example 1.

In the second embodiment to the fourth embodiment, the moving direction of the liquid discharge head 310 in each operation such as the first printing operation, the second printing operation, and the angle adjustment operation may also be the direction opposite to the above-described direction.

The first printing operation in Modification Example 1 and the second printing operation in the first embodiment may be combined, or the first printing operation in the first embodiment and the second printing operation in Modification Example 1 may be combined. Any of these combinations may be appropriately combined with any of the angle adjustment operation or the rotation operation or the third printing operation of any of the second embodiment to the fourth embodiment.

5-2. Modification Example 2

Although a case where the first surface and the second surface expand in the directions orthogonal to each other is illustrated in the above-described form, the present disclosure is not limited to this case, and the first surface and the second surface may expand in, for example, directions intersecting each other within a range of 45° or more and 135° or less, preferably a range of 60° or more and 120° or less. Although a case where each of the first surface and the second surface is the plane is illustrated in the above-described form, the present disclosure is not limited thereto, and for example, the entirety of the first surface or the second surface may be gently bent or curved, or fine irregularities may be provided on the first surface or the second surface. A height of the protrusion portion or a depth of the recess portion in the irregularities is, for example, smaller than the above-mentioned distance WG. The first surface or the second surface having the irregularities may be regarded as being close to a planar surface.

When the first surface or the second surface is gently bent or curved, the movement of the liquid discharge head 310 in the first printing operation and the second printing operation is a locus bent or curved according to the bending or curving of the first surface or the second surface in order to maintain the distance WG at a constant value. In this case, the first scanning axis and the second scanning axis can be regarded as axes along a direction in which the total amount of movement in the bent or curved locus is the largest.

5-3. Modification Example 3

Although the configuration using the 6-axis vertical articulated robot as the moving mechanism is illustrated in the above-described form, the present disclosure is not limited to this configuration. The moving mechanism can change the position and pose of the liquid discharge head relative to the workpiece in three dimensions. Accordingly, the moving mechanism may be, for example, a vertical multi-axis robot other than the 6-axis robot, or may be a horizontal multi-axis robot. A movable portion of the robot arm is not limited to a rotating mechanism, and may be, for example, an expansion and contraction mechanism or the like. Although the moving mechanism having the configuration for moving the liquid discharge head is illustrated in the above-described form, the present disclosure is not limited to this configuration. For example, the position of the liquid discharge head may be fixed, the workpieces may be moved by the moving mechanism, and a position and a pose of the workpiece relative to the liquid discharge head may be changed three-dimensionally.

5-4. Modification Example 4

Although a configuration in which printing is performed by using one type of ink is illustrated in the above-described embodiment, the present disclosure is not limited to this configuration, and is applicable to a configuration in which printing is performed by using two or more types of ink.

5-5. Modification Example 5

The application of the three-dimensional object printing apparatus of the present disclosure is not limited to printing. For example, a three-dimensional object printing apparatus that discharges a solution of a coloring material is used as a manufacturing apparatus for forming a color filter of a liquid crystal display apparatus. A three-dimensional object printing apparatus that discharges a solution of a conductive material is used as a manufacturing apparatus for forming a wiring and an electrode on a wiring substrate.

What is claimed is:

1. A three-dimensional object printing apparatus comprising:
    a liquid discharge head having a nozzle surface on which a plurality of nozzles which discharge a liquid are provided; and
    a moving mechanism that changes a position and a pose of the liquid discharge head relative to a three-dimensional workpiece, wherein
    the workpiece has a first surface and a second surface that forms a corner bent or curved in a concave shape between the first surface and the second surface, and
    when (i) an axis along a scanning direction in which the liquid discharge head is moved with respect to the workpiece in a first printing operation of performing printing on the first surface is a first scanning axis, (ii) the nozzle surface is inclined with respect to the first scanning axis, and (iii) a normal vector of the nozzle surface in the first printing operation is a first discharge vector, the first discharge vector of th nozzle surface has a component in a direction toward the second surface along the first scanning axis, the direction of the component of the first discharge vector being parallel to the first surface, and the nozzle surface is inclined with respect to the first surface in the first printing operation and is also inclined with respect to the second surface in a second printing operation of performing printing on the second surface.

2. The three-dimensional object printing apparatus according to claim 1, wherein in the first printing operation, the liquid discharge head moves relative to the workpiece in a direction approaching the second surface.

3. The three-dimensional object printing apparatus according to claim 1, wherein in the first printing operation, the liquid discharge head moves relative to the workpiece in a direction away from the second surface.

4. The three-dimensional object printing apparatus according to claim 1, wherein when an axis along a scanning direction of the liquid discharge head with respect to the workpiece in the second printing operation of performing printing on the second surface is a second scanning axis and a normal vector of the nozzle surface in the second printing operation is a second discharge vector, the second discharge vector has a component in a direction toward the first surface along the second scanning axis.

5. The three-dimensional object printing apparatus according to claim 4, wherein in the second printing operation, the liquid discharge head moves relative to the workpiece in a direction away from the first surface.

6. The three-dimensional object printing apparatus according to claim 4, wherein in the second printing operation, the liquid discharge head moves relative to the workpiece in a direction approaching the first surface.

7. The three-dimensional object printing apparatus according to claim 4, wherein the nozzle surface has a nozzle array including a plurality of nozzles arrayed, a first end in a direction intersecting an array direction of the plurality of nozzles, and a second end on a side opposite to the first end, in the first printing operation, the first end is positioned at a position closer to the second surface than the second end, and in the second printing operation, the first end is positioned at a position closer to the first surface than the second end.

8. The three-dimensional object printing apparatus according to claim 4, wherein an angle formed by the first scanning axis and the first discharge vector and an angle formed by the first scanning axis and the second discharge vector are equal to each other.

9. The three-dimensional object printing apparatus according to claim 4, wherein an angle formed by the first scanning axis and the first discharge vector or the second discharge vector is adjusted in a period between the first printing operation and the second printing operation.

10. The three-dimensional object printing apparatus according to claim 9, wherein the angle formed by the first scanning axis and the first discharge vector or the second discharge vector is adjusted such that an angle formed by the first scanning axis and the first discharge vector and an angle formed by the second scanning axis and the second discharge vector are equal to each other.

11. The three-dimensional object printing apparatus according to claim 1, wherein the nozzle surface has a nozzle array including a plurality of nozzles arrayed, a first end in a direction intersecting an array direction of the plurality of nozzles, and a second end on a side opposite to the first end, and in the first printing operation, $A2 \leq WG \times \tan\theta1$, where the first end is at a position closer to the second surface than the second end, a distance between the second end and the nozzle array is A2, a distance between the nozzle array and the first surface in a normal direction of the nozzle surface is WG, and an angle formed by the normal direction of the nozzle surface and the first surface is $\theta1$.

12. The three-dimensional object printing apparatus according to claim 1, wherein the nozzle surface has a nozzle array including a plurality of nozzles arrayed, a first end in a direction intersecting an array direction of the plurality of nozzles, and a second end on a side opposite to the first end, and in the first printing operation, $A1 \times \sin\theta1 \leq WG \times \cos\theta1$, where the first end is at a position closer to the second surface than the second end, a distance between the first end and the nozzle array is A1, a distance between the nozzle array and the first surface in a normal direction of the nozzle surface is WG, and an angle formed by the normal direction of the nozzle surface and the first surface is $\theta1$.

13. The three-dimensional object printing apparatus according to claim 1, wherein a third printing operation of performing printing on the first surface or the second surface is executed in a state in which the normal vector of the nozzle surface and a normal vector of the first surface or the second surface are parallel or coincide with each other.

14. The three-dimensional object printing apparatus according to claim 13, wherein in performing printing on the first surface, the third printing operation is executed when a distance between the liquid discharge head and the second surface is equal to or greater than a predetermined distance, and the first printing operation is executed when the distance between the liquid discharge head and the second surface is less than the predetermined distance.

15. The three-dimensional object printing apparatus according to claim 1, wherein at least a part of the nozzle surface overlaps with the second surface in the first printing operation when viewed along the first scanning axis.

* * * * *